US011827161B2

(12) United States Patent
Bachan

(10) Patent No.: US 11,827,161 B2
(45) Date of Patent: Nov. 28, 2023

(54) MAGNET OVERMOLDING FOR MOUNTING OF A DECORATIVE FEATURE

(71) Applicant: Precision Masters Inc., Rochester Hills, MI (US)

(72) Inventor: Matthew R Bachan, Bloomfield Hills, MI (US)

(73) Assignee: Precision Masters Inc., Rochester Hills, MI (US)

( * ) Notice: Subject to any disclaimer, the term of this patent is extended or adjusted under 35 U.S.C. 154(b) by 170 days.

(21) Appl. No.: 17/102,055

(22) Filed: Nov. 23, 2020

(65) Prior Publication Data

US 2021/0155170 A1    May 27, 2021

Related U.S. Application Data

(60) Provisional application No. 63/059,519, filed on Jul. 31, 2020, provisional application No. 62/938,759, filed on Nov. 21, 2019.

(51) Int. Cl.
*B60R 13/02* (2006.01)
*F16B 1/00* (2006.01)
(Continued)

(52) U.S. Cl.
CPC ...... *B60R 13/0206* (2013.01); *B60R 13/0231* (2013.01); *F16B 1/00* (2013.01);
(Continued)

(58) Field of Classification Search
CPC ............ B60R 13/0206; B60R 13/0212; B60R 13/0231; B60R 13/0243; B60R 2013/011;
(Continued)

(56) References Cited

U.S. PATENT DOCUMENTS

| 5,280,991 A * | 1/1994 | Weiland ............... B60R 13/0231 296/214 |
| 6,857,809 B2 | 2/2005 | Granata |
| 7,213,378 B2 | 5/2007 | Randez Perez |
| 7,306,190 B2 | 12/2007 | Tisol, Jr. |

(Continued)

FOREIGN PATENT DOCUMENTS

| CN | 201435821 | 3/2010 | |
| EP | 3272590 A1 * | 1/2018 | ......... B60R 13/0231 |
| KR | 101446607 B1 * | 9/2014 | ......... B60R 13/0206 |

OTHER PUBLICATIONS

Kwon, Vehicle Headlining:, Publication Date: Sep. 25, 2014, Publisher: Korean Patent Office, Edition: KR101446607B1 (Year: 2014).*

*Primary Examiner* — Dennis H Pedder
*Assistant Examiner* — Joyce Eileen Hill
(74) *Attorney, Agent, or Firm* — Foster Swift Collins & Smith PC; Mikhail Murshak

(57) ABSTRACT

A system of securing a connection of a decorative feature to a magnetic surface is provided. The system includes (a) a decorative feature attached to a substrate; (b) a magnet configured to be positioned within the substrate; and (c) two or more attachment arms extending away from the substrate and overmolding the magnet. The magnet is configured to magnetically secure the decorative feature to a magnetic attachment surface. In an example the substrate is a panoramic ring of a vehicle and the decorative feature is a headliner. The magnet is provided in a magnet bowl that includes an engagement feature to assist in overmolding. An attachment clip is also provided having two or more attachment arms with a magnet assembly overmolded to the clip. A pressure fit clip is provided having two or more attachment arms with a magnet assembly overmolded to the clip.

9 Claims, 30 Drawing Sheets

(51) Int. Cl.
  *B29C 45/14* (2006.01)
  *B29K 705/08* (2006.01)
  *B29L 31/30* (2006.01)

(52) U.S. Cl.
  CPC .......... *B29C 45/14* (2013.01); *B29K 2705/08* (2013.01); *B29L 2031/3011* (2013.01); *B60R 13/0243* (2013.01); *F16B 2001/0035* (2013.01)

(58) Field of Classification Search
  CPC ........ B60R 2013/02; B60R 2013/0807; B60R 11/00; B60R 11/0003; B60R 11/0028; B60R 11/0057; B60R 11/007; F16B 1/00; F16B 2001/0035; B29C 45/14; B29K 2705/08
  USPC ............ 296/37.7, 37.8, 210, 214; 248/206.5, 248/309.4, 537
  See application file for complete search history.

(56) References Cited

U.S. PATENT DOCUMENTS

| | | |
|---|---|---|
| 7,435,031 B2 | 10/2008 | Granata |
| 7,547,061 B2 | 6/2009 | Horimatsu |
| 7,922,135 B2 | 4/2011 | Granata |
| 8,287,034 B2 | 10/2012 | Smith |
| 8,398,155 B2 | 3/2013 | Andochick |
| 8,555,468 B2 | 10/2013 | Moerke |
| 8,615,852 B2 | 12/2013 | Smith |
| 9,353,890 B2 | 5/2016 | Dickinson et al. |
| 9,499,108 B2 | 11/2016 | Dickinson et al. |
| 9,676,345 B2 | 6/2017 | Linson et al. |
| 9,783,133 B2 | 10/2017 | Huelke et al. |
| 9,956,926 B2 | 5/2018 | Iriarte et al. |
| 10,228,000 B2 | 3/2019 | Tirrell et al. |
| 2013/0305497 A1 | 11/2013 | Coman |
| 2016/0040693 A1 | 2/2016 | Popovski et al. |
| 2016/0334053 A9 | 11/2016 | Dickenson |
| 2017/0097109 A9 | 4/2017 | Dickinson et al. |
| 2018/0043942 A1 | 2/2018 | Coman |

* cited by examiner

MAGNET OVERMOLDING FOR MOUNTING OF A DECORATIVE FEATURE

CROSS REFERENCE TO RELATED APPLICATION

This application claims priority to U.S. Provisional Application No. 62/938,759 filed Nov. 21, 2019 and to U.S. Provisional Application No. 63/059,519 filed Jul. 31, 2019. These applications are hereby incorporated herein by reference in their entirety.

TECHNICAL FIELD

The present disclosure relates generally to an overmolded magnet for the securing of a decorative feature or panel or substrate to a magnet attachment surface.

DESCRIPTION OF RELATED ART

Car manufacturing and assembly can be a long and cumbersome process. For example, within that process involves installation of decorative panels such as a headliner. Broadly speaking, a headliner is a composite material that is adhered to an inner side of a roof of a car or other vehicle. Adhering the headliner to the roof of the car is important in terms of aesthetics, comfort and safety. A loose connection of the headliner can lead to a constant rattling sound caused by the headliner banging against the roof of the car or can even lead to a complete separation of the headliner from the roof. To further complicate matters, many roofs on modern cars contain a sunroof, or what is sometimes called a moonroof. A sunroof is any kind of panel on the roof that permits light, air, or both to come into a vehicle. Adhering the headliner to a car roof that contains a sunroof creates more opportunities for loose connections, leading to more rattling or safety concerns.

Many panels or decorative features, such as headliners, today are installed with magnetic clips because they offer easier installation and an improved connection of the headliner to the roof. Often, magnetic clips are assembled with a magnet that is placed inside a magnet bowl. The magnet bowl helps direct the magnetic force to a desired location—e.g., for a headliner, the roof. Around the perimeter of a sunroof is a plastic substrate. In an example, the plastic substrate is a panoramic ring. The panoramic ring is added for rigidity, support, and a connection point for the magnetic clips. Today, most magnetic clips are attached to the panoramic ring via 'doghouses', which are protruding circular bodies that provide a point of connection for the clip. This process must be done prior to installation and is a cumbersome and laborious process.

SUMMARY

The present disclosure provides for a system of securing a connection of a decorative feature to a magnetic attachment surface. The system includes: (a) a decorative feature attached to a substrate; (b) a magnet configured to be positioned within the substrate; and (c) two or more attachment arms extending away from the substrate and overmolding the magnet. The magnet is configured to magnetically secure the decorative feature to a magnetic attachment surface. In an example, the decorative feature is a headliner of a vehicle. The headliner can include a polymer-based substrate, and the magnetic attachment surface can be formed on a frame of the vehicle. In another example, the headliner defines a sunroof cutout for mounting to a roof frame portion of the vehicle, and the substrate forms a panoramic ring that is positioned around the sunroof cutout for magnetically mounting the headliner to the roof frame portion.

In a further example, the system of the present disclosure provides for a plurality of magnets distributed throughout the polymer-based substrate. Each of the plurality of magnets can be offset from the substrate by two or more attachment arms extending from the substrate. Each set of the two or more attachment arms extend from the substrate overmolding a corresponding magnet of the plurality of magnets. The plurality of magnets distribution can be configured to magnetically mount to a roof frame portion of the vehicle having the magnetic attachment surface and safely secure the headliner thereto.

In yet another example, the magnet is positioned within an interior receiving cavity of a magnet bowl having an outer surface. The magnet and the magnet bowl form a magnet assembly and the two or more attachment arms extend offset from the substrate for overmolding the magnet assembly. The two or more attachment arms can overmold the magnet assembly in a configuration selected from the group consisting of fully encompassing the magnet assembly, encompassing a bottom portion of the magnet assembly, encompassing a top portion of the magnet assembly, encompassing a side portion of the magnet assembly around a circumference of the magnet assembly, and combinations thereof. The magnet bowl can further define an engagement feature, and the two or more attachment arms overmold the magnet bowl by engaging with the engagement feature through overmolding. The engagement feature can include a member selected from the group consisting of holes formed radially along the outer surface of the magnet bowl, one or more grooves formed radially along the outer surface of the magnet bowl, knurling formed radially along the outer surface of the magnet bowl, a center hole of the magnet bowl, or combinations thereof.

The two or more attachment arms can be configured to allow for movement and articulation for variations in flatness and surface angles of the magnetic attachment surface. In still yet another example, the two or more attachment arms include three attachment arms total and the three attachment arms are spaced apart from each other to overmold a magnet offset from the substrate and are integrally formed with the substrate. In even still a further example, the two or more attachment arms and the substrate are molded in die draw overmolding the magnet.

The present disclosure further provides for a system of securing a connection of a decorative feature to a magnetic attachment surface through an attachment clip. The system includes: (a) an attachment clip having an attachment base; (b) two or more attachment arms extending from the attachment base of the attachment clip; and (c) a magnet overmolded with the two or more attachment arms positioned away from the attachment base. The attachment clip is affixed to a decorative feature at the attachment base and the decorative feature optionally includes a substrate wherein the attachment clip is affixed to the substrate of the decorative feature. The magnet is configured to magnetically secure the attachment clip affixed to the decorative feature to the magnetic attachment surface. In an example, the magnet is positioned within an interior receiving cavity of a magnet bowl having an outer surface. The magnet and the magnet bowl form a magnet assembly and the two or more attachment arms overmold the magnet assembly in a configuration selected from the group consisting of fully encompassing the magnet assembly, encompassing a bottom portion of the magnet assembly, encompassing a top portion of the magnet assembly, encompassing a side portion of the magnet assembly around a circumference of the magnet assembly, and combinations thereof. In another example, the magnet bowl defines an engagement feature and the two or more attachment arms overmold the magnet bowl by engaging with the engagement feature through overmolding. The engagement feature can include a member selected from the group consisting of holes formed radially along an outer surface of the magnet bowl, one or more grooves formed radially along an outer surface of the magnet bowl, knurling formed radially along an outer surface of the magnet bowl, a center hole of the magnet bowl, or combinations thereof.

The present disclosure still further provides for a system of securing a connection of a decorative feature to a magnetic attachment surface through a pressure fit clip. The system includes: (a) a decorative feature having an optional substrate; (b) a doghouse affixed to the decorative feature or to the optional substrate of the decorative feature; and (c) a pressure fit clip including a bottom base, two or more attachment arms engaging a magnet through overmolding, and an optional engagement disk. The magnet is overmolded into the pressure fit clip formed between the two or more attachment arms. The bottom base of the pressure fit clip is configured to securely fit within an aperture in the doghouse. The magnet is configured to magnetically mount the decorative feature to the magnetic attachment surface.

In an example, the attachment arms traverse to form a "U" configuration to allow for articulation of the pressure fit clip, configured to form a secure magnetic mount to accommodate variations in flatness and surface angles of the magnetic attachment surface. The magnet can be positioned within an interior receiving cavity of a magnet bowl having an outer surface. The magnet and the magnet bowl form a magnet assembly and the two or more attachment arms overmold the magnet assembly in a configuration selected from the group consisting of fully encompassing the magnet assembly, encompassing a bottom portion of the magnet assembly, encompassing a top portion of the magnet assembly, encompassing a side portion of the magnet assembly around a circumference of the magnet assembly, and combinations thereof. The magnet bowl can define an engagement feature and the two or more attachment arms overmold the magnet bowl by engaging with the engagement feature through overmolding, and wherein the engagement feature includes a member selected from the group consisting of holes formed radially along an outer surface of the magnet bowl, one or more grooves formed radially along an outer surface of the magnet bowl, knurling formed radially along an outer surface of the magnet bowl, a center hole of the magnet bowl, or combinations thereof. In an example, the pressure fit clip includes the engagement disc formed between the attachment arms and the bottom base to further secure the pressure fit clip within the doghouse of the decorative feature. The decorative feature can include a headliner of a vehicle or a headliner having a substrate for mounting to a frame of a vehicle.

The present disclosure relates to a system, tool apparatus, and method of forming a substrate for securing a decorative feature or panel to a magnet attachment surface. Magnet assemblies are provided and are positioned within and/or throughout a substrate. The magnet assemblies and substrate engage with a magnet attachment surface. Magnetic surfaces exist in vehicles such as cars, trucks, jets and airplanes, and boats. The magnet assemblies can engage with a decorative panel and secure the decorative panel to the magnet attachment surface when the magnet assemblies engage with the magnet attachment surface. This connection tightly secures the decorative panel to the magnet attachment surface in an a relatively easy installation and arrangement process. Decorative features or panels include but are not limited to any desired cover or aesthetic feature, such as headliners, door covers, panels, and/or any decorative class, to cover structural parts of a vehicle or frame. Substrate means any plastic part a magnet is molded to or the decorative panel itself.

The present disclosure further provides for a tool, a system, and a method whereby magnets or magnet assemblies secure a vehicle headliner to a magnet attachment surface on an interior portion of a vehicle roof through a panoramic ring. The panoramic ring is shaped and sized according to a vehicle manufacturer specification and should define one or more openings for fitting a sunroof. The panoramic ring is adapted to affix to an interior portion of a vehicle roof through the magnets and safely secure the headliner to the roof of the vehicle. In an example, the panoramic ring includes one or more magnets or magnetic assemblies positioned within overmolded arms. The assemblies include a magnet having a strength sufficient to hold the panoramic ring to the roof and a magnet bowl adapted to encompass the magnet and direct magnetic strength towards the roof.

In an example, the magnets or magnet assemblies are overmolded to the panoramic ring so to as to form one continuous piece connected by two or more attachment arms to each magnet or magnet assembly, bypassing any further installation of the magnet assemblies to the panoramic ring. This provides for easy installation and a ready-to-use panoramic ring that will form a consistently secure and tight connection. In one example, the overmolding is configured so as to fully encompass the magnet assemblies. In another example, the overmolding is configured so as to encompass the top portion of the magnet assemblies. In yet another example, the overmolding is configured so as to encompass the bottom portion of the magnet assemblies. In another example, the overmolding is configured so as to encompass part or all of the sides of the magnet assemblies.

The present disclosure further provides for a tool defining an injection cavity for forming a panoramic ring having arms stepped up for receiving one or more magnet assemblies. The tool is sized and shaped according to a vehicle's specific design and specification. The tool is further sized and shaped to receive one or more magnets or magnet assemblies as an insert prior to overmolding.

The present disclosure provides for an overmolded attachment clip affixed to a headliner of a vehicle such as an automobile, truck, boat, airplane or any other vehicle with a roof and headliner. In one example, the attachment clip is configured with a tool using die draw where that the attachment clip and magnet assemblies are molded according to the mold of the die. Following molding, the tool can then be opened in such a way so that the attachment clip and magnet assemblies are removed from the tool without causing damage to the attachment clip, magnet assemblies, or tool. The attachment clip allows for easy assembly and secure connection of the headliner to the roof of the vehicle.

The present disclosure further provides for a pressure fit clip that engages with a doghouse to attach a headliner to the roof of a vehicle. A doghouse is a type of clip attachment in the shape of a protruding circular bodies which provide a point of connection for a clip and is used to secure a headliner to the roof of a vehicle by inserting a clip on the interior surface of the roof to an aperture within the doghouse. In this example, the pressure fit clip is made of a bottom base, an optional engagement disk, two attachment arms and a magnet or magnet assembly. In one embodiment, the pressure fit clip is molded in die draw where the pressure fit clip and magnet assemblies are injection molded according to the mold of the die. Following injection molding, the tool can then be opened in such a way so that the attachment clip and magnet assemblies are removed from the tool without causing damage to the pressure fit clip, magnet assemblies, or tool. The engagement disk can be positioned above the bottom base and connected to the magnet assembly by the attachment arms, which are overmolded on to the magnet assembly. The overmolding holds the magnet assembly in place and positions a magnet within a magnet bowl of the magnet assembly. To secure the headliner to the roof, the bottom base and optional engagement disk of the pressure fit clip is inserted within the aperture of the doghouse on the headliner. The magnet assembly is positioned above the doghouse facing the interior portion of the roof in order to secure the headliner to the roof.

For purposes of summarizing the disclosure, certain aspects, advantages, and novel features of the disclosure have been described herein. It is to be understood that not necessarily all such advantages may be achieved in accordance with any one particular embodiment of the disclosure. Thus, the disclosure may be embodied or carried out in a manner that achieves or optimizes one advantage or group of advantages as taught herein without necessarily achieving other advantages as may be taught or suggested herein. The features of the disclosure which are believed to be novel are particularly pointed out and distinctly claimed in the concluding portion of the specification. These and other features, aspects, and advantages of the present disclosure will become better understood with reference to the following drawings and detailed description.

BRIEF DESCRIPTION OF THE DRAWINGS

The figures which accompany the written portion of this specification illustrate systems of use for the present disclosure constructed and operative according to the teachings of the present disclosure.

The various embodiments of the present disclosure will hereinafter be described in conjunction with the appended drawings, wherein like designations denote like elements.

DETAILED DESCRIPTION

Figure 1A:
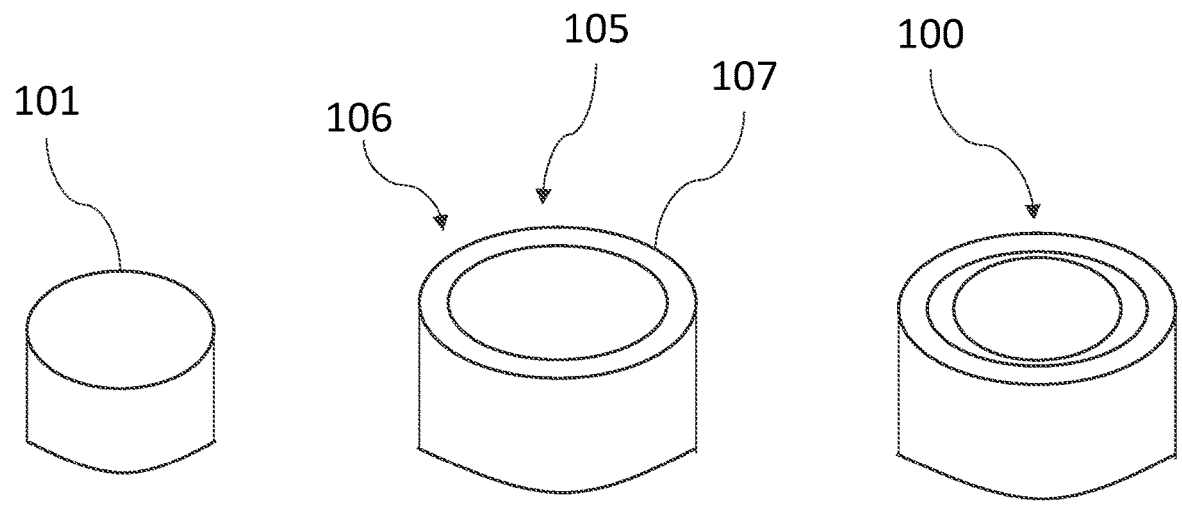
FIG. 1A illustrates a perspective view of a magnet, a magnet bowl, and an assembled magnet assembly.

The present disclosure relates to a system, tool apparatus, and method of forming a substrate for securing a decorative feature, a substrate or a substrate for a decorative feature, or panel to a magnet attachment surface. In an example, a magnet is or a plurality of magnets are provided and positioned within and/or throughout a substrate. The magnet and substrate magnetically engage with a magnet attachment surface. In an example, the magnet attachment surface can be any ferromagnetic surface for which a decorative feature or panel is to be mounted.

Magnetic surfaces exist in vehicles such as cars, trucks, jets and airplanes, and boats. In an example, a magnetic surface is provided on an interior surface of a roof of a vehicle. A magnet or magnet assembly engages with a decorative panel and secures the decorative panel to the magnet attachment surface when the magnet engages with the magnet attachment surface. This connection tightly secures the decorative panel to the magnet attachment surface in a relatively easy installation and arrangement process. Decorative features or panels include, but are not limited to, any desired cover or aesthetic feature to cover structural parts of a vehicle or frame. This includes, but is not limited to, headliners, door covers, panels, and/or any decorative surface that an end user might see. Substrate means any plastic part to which a magnet is overmolded. This can be permanently or semi-permanently attached to a decorative feature or panel. The substrate can also be the decorative panel itself.

In an example, the present disclosure relates to a system, tool apparatus, and method of forming a panoramic ring for securing a headliner to an interior roof of a vehicle. This can be particularly useful for a vehicle having a sunroof. A car with a sunroof provides challenges for effectively and efficiently securing a headliner to the roof of the vehicle. The present disclosure utilizes magnet assemblies that are positioned within and throughout a panoramic ring that encircles a sunroof cutout. The roof of the vehicle is typically constructed of metal having ferromagnetic surfaces. The magnet assemblies and panoramic ring engage with the ferromagnetic surfaces on the roof so as to safely secure the headliner to the roof of the vehicle in an effective and desired position. The magnet assemblies are positioned within the panoramic ring through an overmolding process whereby the magnet assemblies are encompassed with the overmolding material to form a continuous piece with the panoramic ring, greatly reducing the installation and arrangement process.

The panoramic ring overmolding a magnet or magnet assembly can be molded in die draw without the need for additional tooling or secondary action. The term "die draw" means an injection molding condition based on part design and mold design. The axis that the mold opens is the direction of die-draw. Any features of a part that cannot be molded with this condition are considered not in die-draw. These features would require secondary tool actions, like slides, to create with injection molding. Cost can significantly increase for manufacturing parts that require secondary action.

The presence of two or more attachment arms allows for a part to be made in die draw without the need for expensive and complicated tooling or secondary action. Without the arms, to make a part in die draw would require a prohibitively expensive and large mold to accommodate a part. Moreover, the attachment arms allow for better articulation of the magnet because it is stepped off or offset from a general plane defined by a base part. Additional tooling in die draw can significantly increase expense and reduce efficiency of part manufacturing. Using stepped off attachment arms allows for relatively longer parts to be made via die draw absent these undesired tooling features while still incorporating a magnet or magnet assembly.

The present disclosure further provides for an attachment clip with an attachment base that is affixed to a decorative feature (e.g., a headliner) and a magnet assembly that engages with a magnetic surface (e.g., a roof or frame of a vehicle).

The present disclosure further provides for a pressure fit clip that engages with a doghouse on a decorative feature (e.g., a headliner and a magnetic surface (e.g., a roof of a vehicle).

Figure 1B:
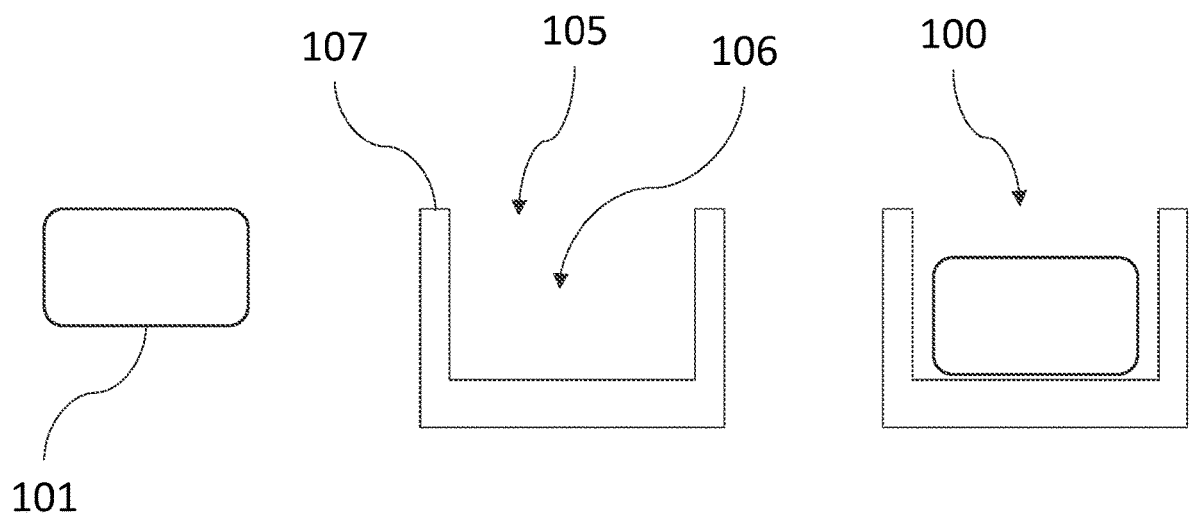
FIG. 1B illustrates a side cross section view of the magnet, magnet bowl, and assembled magnet assembly of FIG. 1A.

Referring to FIGS. 1A-1B, a schematic of an exemplary magnet assembly 100 is shown. FIG. 1A shows the magnet assembly 100 from a perspective view. FIG. 1B illustrates the magnet assembly 100 from cross section side view. In this example, magnet 101 securely fits within a cavity 106 of a magnet bowl 105. Magnet 101 and magnet bowl 105 engage to form magnet assembly 100. In this example, magnet bowl 105 is cylindrically shaped and curved with a concentric cavity 106 that forms a magnet bowl wall 107 and a magnet bowl bottom. Cavity 106 is configured to receive a circular or cylindrical magnet 101. Magnet 101 is secured within cavity 106 by magnet bowl wall 107 and magnet bowl bottom. Typically, magnet assembly 100 is relatively small, e.g., about the size of a coin.

Figure 2:
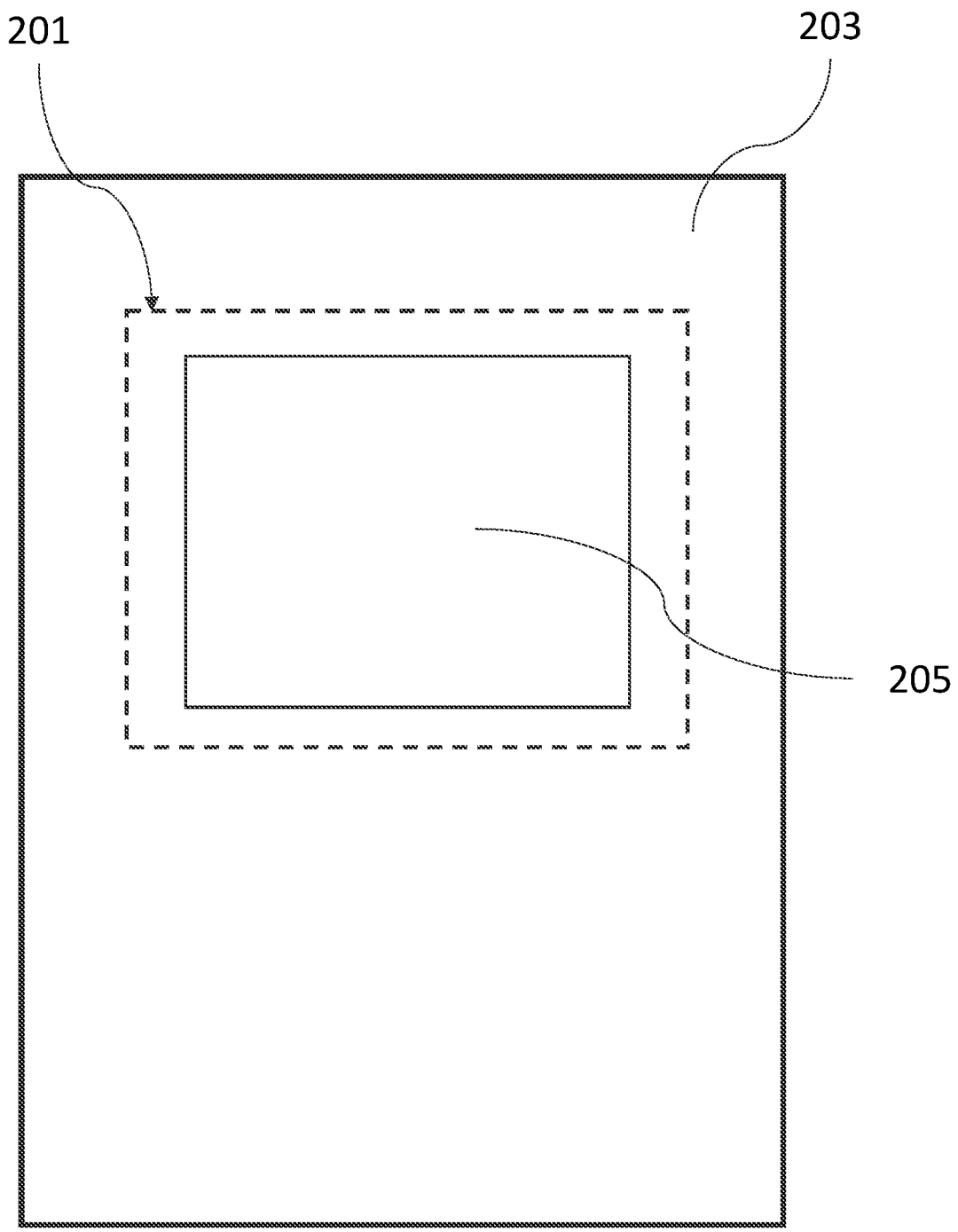
FIG. 2 illustrates a schematic of a top view of a headliner, panoramic ring, and sunroof.

As an illustrative example, FIG. 2 illustrates to schematic view of an interior roof of a vehicle according to the present disclosure. In this example, magnet assemblies are affixed to a substrate of a decorative panel. The magnet assemblies engage with a magnet attachment surface, securing the decorative panel to the magnet attachment surface. In an example, the substrate is a panoramic ring; the decorative panel is a headliner; the magnet attachment surface is any interior frame or surface of a vehicle such as a roof or a trunk. The vehicle can be an automobile, truck, boat, airplane or any other vehicle having ferromagnetic surfaces for mounting a cover or decorative feature. In this example, a headliner 203 is fitted and formed to fit the interior portion of a roof frame portion, that is magnetic forming a magnetic attachment surface, of the vehicle having a sunroof 205. To securely place headliner 203 to the roof of the vehicle, panoramic ring 201 is fitted and formed to encircle sunroof 205 and secure headliner 203 to the roof of the vehicle.

Figure 3A:
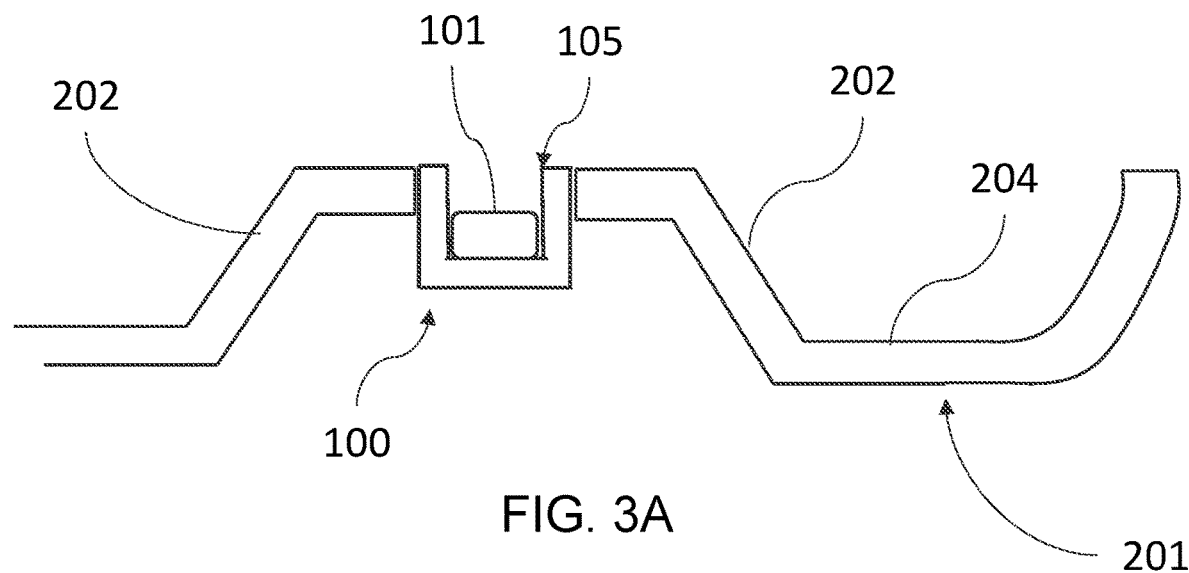
FIG. 3A illustrates a side cross section view of a magnet assembly positioned within a panoramic ring.
Figure 3B:
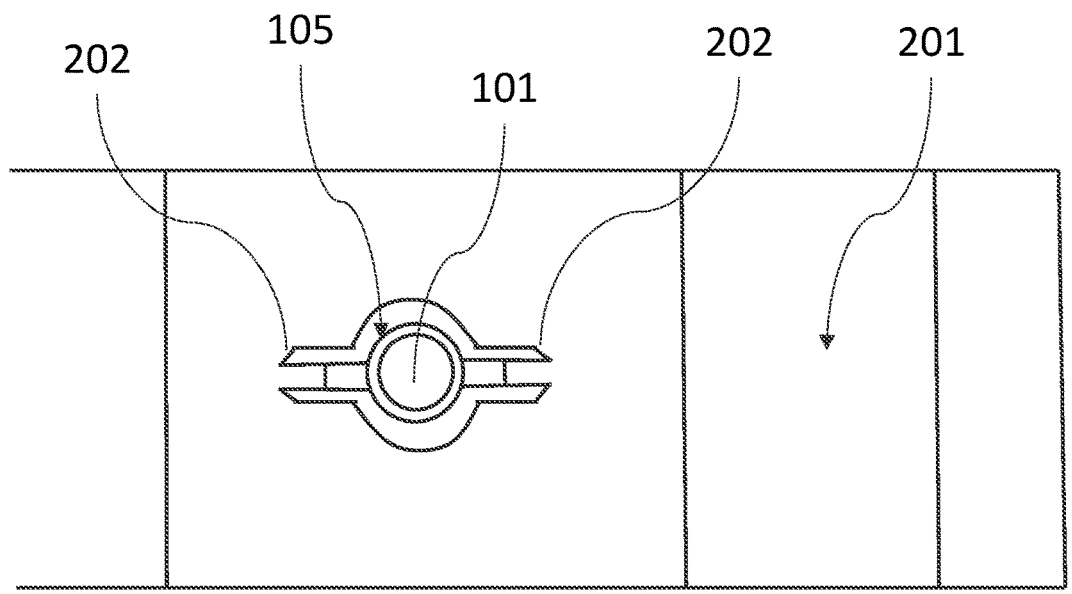
FIG. 3B illustrates a top view of the magnet assembly of FIG. 3A positioned within the panoramic ring.

FIGS. 3A-3B illustrate the magnet assembly 100 engaging with the panoramic ring 201 from a side view and top view, respectively. FIG. 3A depicts a side view of magnet assembly 100, with magnet 101 and magnet bowl 105, positioned within panoramic ring 201. The magnet bowl 105 can be effective in directing magnetic forces towards a desired direction, i.e., metal on a roof of a vehicle; however, in another embodiment, magnet 101 is positioned within panoramic ring 201 absent the magnet bowl 105. The present disclosure provides for a panoramic ring 201 sized and shaped to receive a magnet assembly 100. The panoramic ring 201 can be injection molded according to specific vehicle and headliner design, size and shape. In an example, the panoramic ring 201 includes a plurality of magnet assemblies 100, or just magnets 101, spaced around the ring to ensure a secure engagement with a roof of a vehicle. In a further example, the magnet assemblies 100 are spaced apart evenly with respect to each other. In yet another example, six magnets 101, or magnet assemblies 100, are positioned around panoramic ring 201 and spaced apart to ensure a secure connection to a roof of a vehicle. The panoramic ring 201 is overmolded with the magnet assembly 100 connected through attachment arms 202.

The panoramic ring 201 includes a base portion 204 and at least a pair of attachment arms 202 (commonly referred to as arms 202) for mounting a magnet assembly 100 between the pair of arms 202. In an example, the arms 202 are raised portions from the base portion 204 and are configured to receive the magnet assembly 100 therebetween. In this example, a pair of arms 202 are formed that extend upward from the base portion 204 of panoramic ring 201. Arms 202 form around magnet assembly 100 via an injection molding tool. Arms 202 extend upward from base 204 to allow for the magnet assembly 100 to engage and mount with a metal portion of a vehicle's roof. The magnet 101 thus mounts the panoramic ring 201 and a corresponding headliner to the roof of the vehicle.

The present disclosure provides for a tool in die draw (not shown) sized and shaped to form a panoramic ring 201 having arms 202 for mounting one or more magnetic assemblies 100. The tool can include an insert to allow for insertion of the magnets 101 or magnet assemblies 100 prior to the die draw process. This allows for the formation of the panoramic ring 201 integral with the magnet assemblies 100. The panoramic ring and magnet assembly can be manufactured in die draw, thus eliminating a need for additional tooling or secondary action. The presence of attachment arms allows for a part to be made in die draw without the need for expensive and complicated tooling or secondary action. Without the arms, to make a part in die draw would require a prohibitively expensive and large mold to accommodate a part.

By forming the panoramic ring 201 having the magnet assembly 100 integrated therein, costly and time-consuming assembly steps are avoided. This includes avoiding a costly clip-inserting step or other means of attaching a headliner to a vehicle roof. This is also true for any other process of attaching a decorative feature or panel to a desired magnetic surface. Further, human error and faulty equipment mistakes can be further reduced or avoided. In an example, arms 202 extend upward at an angle relative to base 204. An angled mount allows for accommodating of various vehicle shape designs. It also provides for stability as the molding material that forms the panoramic ring engages directly with the magnet assembly. Arms 202 can be formed to allow for movement, allowing for variations in flatness and surface angles and thus improved feasibility and easy of assembly.

Magnet assembly 100 is connected to panoramic ring 201 by arms 202, which are positioned at a left and right side of magnet assembly 100. In this example, the arms 202 engage magnet bowl 105 and traverse at an angle back towards panoramic ring 201. FIG. 3B depicts magnet assembly 100 engaged with panoramic ring 201 from a top view perspective. Arms 202 engage with magnet assembly 101 and form back into panoramic ring 201 to form a seamless reintegration.

Figure 4A:
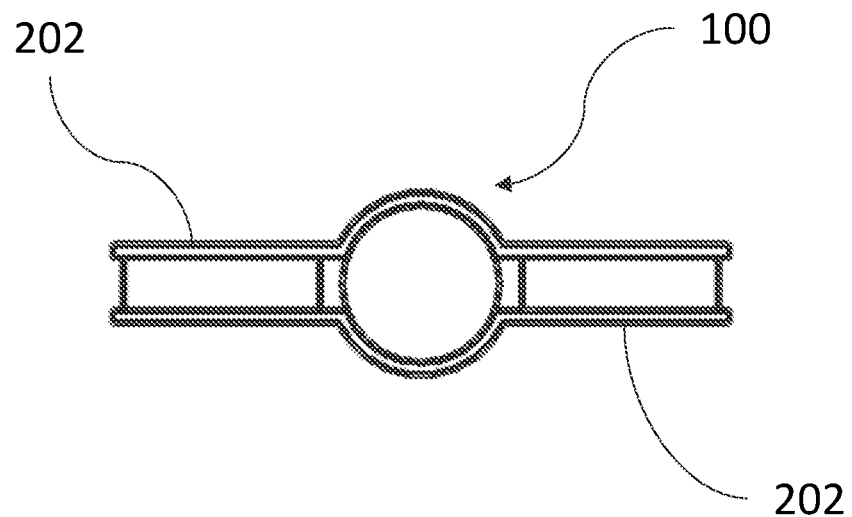
FIG. 4A illustrates a bottom view of a magnet assembly positioned within attachment arms of a panoramic ring.
Figure 4B:
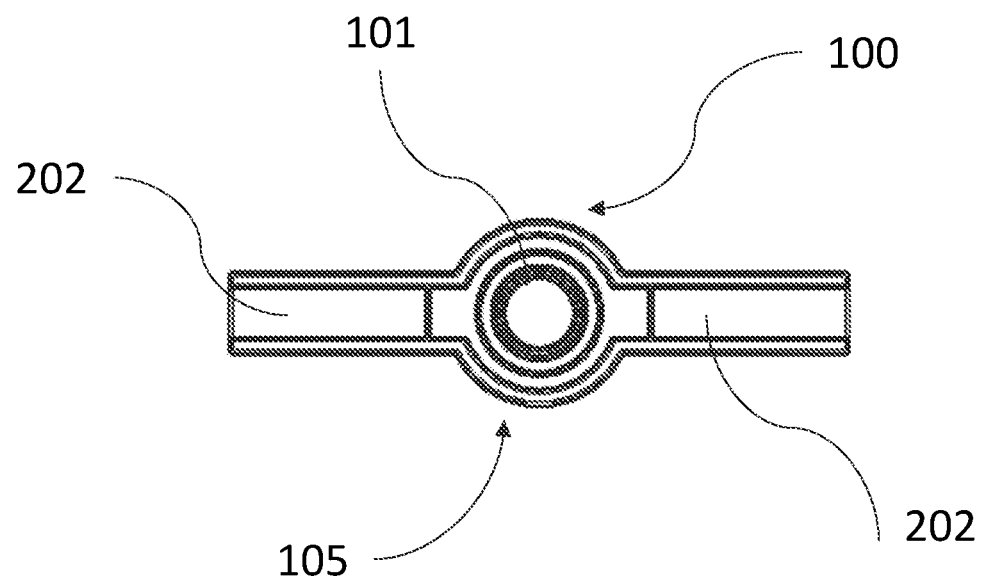
FIG. 4B illustrates a top view of the magnet assembly positioned within arms of the panoramic ring of FIG. 4A.

FIGS. 4A-4B depict an example magnet assembly 100 positioned within attachment arms 202 of a panoramic ring according to the present disclosure. FIG. 4A illustrates a bottom view of magnet assembly 100 mounted with arms 202 engaged on opposite sides of magnet assembly 100. FIG. 4B illustrates a top view of the magnet assembly 100 of FIG. 4A positioned between and mounted to arms 202, with magnet 101 positioned within magnet bowl 105.

Figure 5:
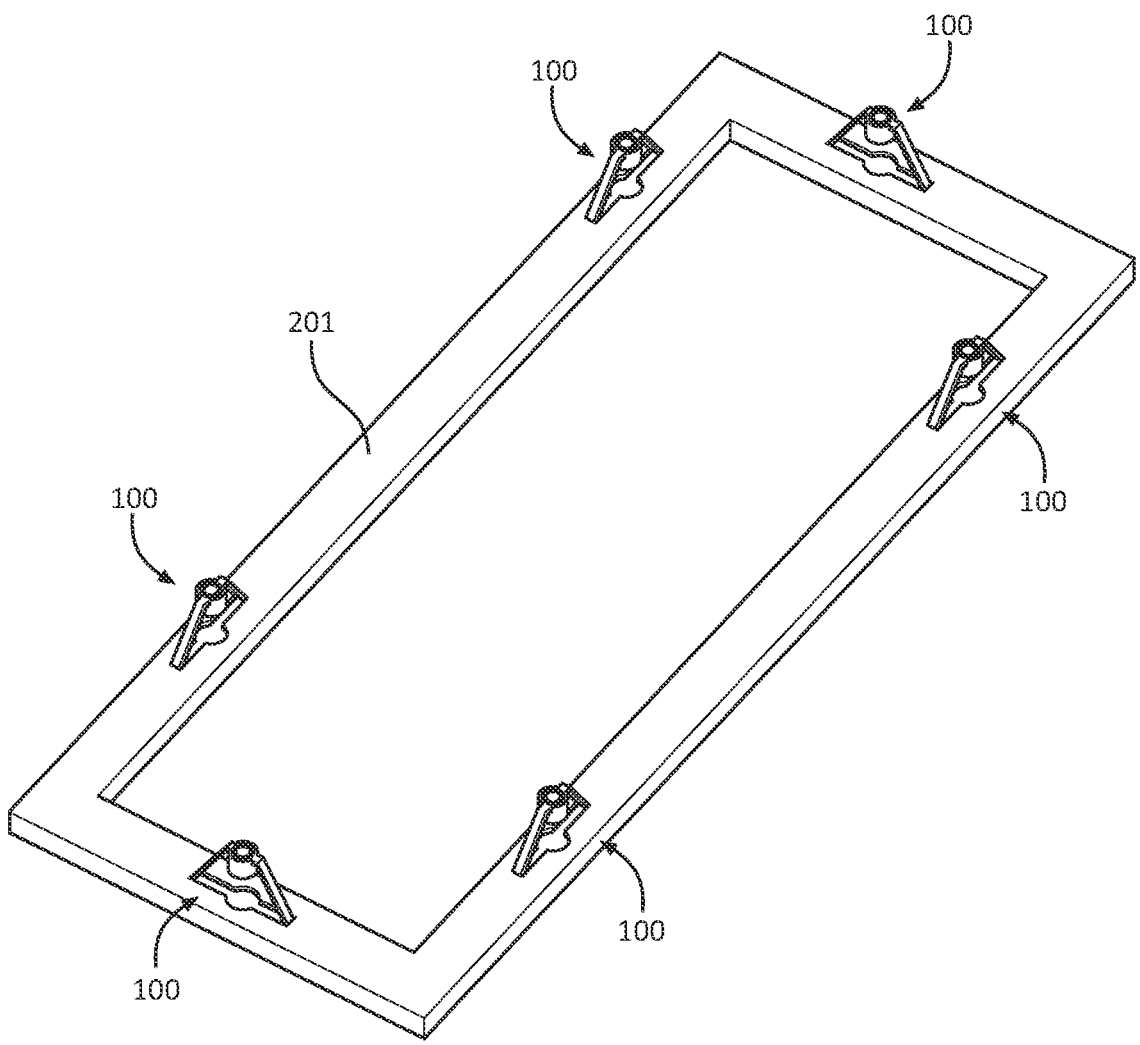
FIG. 5 illustrates a perspective view of a plurality of magnet assemblies positioned within an example panoramic ring according to the present disclosure.

FIGS. 5-7B illustrate various examples of a plurality of magnet assemblies 100 overmolded to a panoramic ring 201. FIG. 5 illustrates a perspective view of a panoramic ring 201 having a plurality of magnet assemblies 100 mounted thereon and defining a rectangular shape. However, the shape of the panoramic ring can be any shape suitable for a desired vehicle design. In this example, six magnet assemblies 100 are spaced apart, relatively evenly from an adjacent assembly, around panoramic ring 201. The position of magnet assemblies 100 relative to each other should be selected to effectively secure headliner 203 to a roof of a vehicle. The number of magnet assemblies 100 and position of those magnet assemblies is dependent on the size and shape of the sunroof cutout based on the specific design of a vehicle.

Figure 6A:
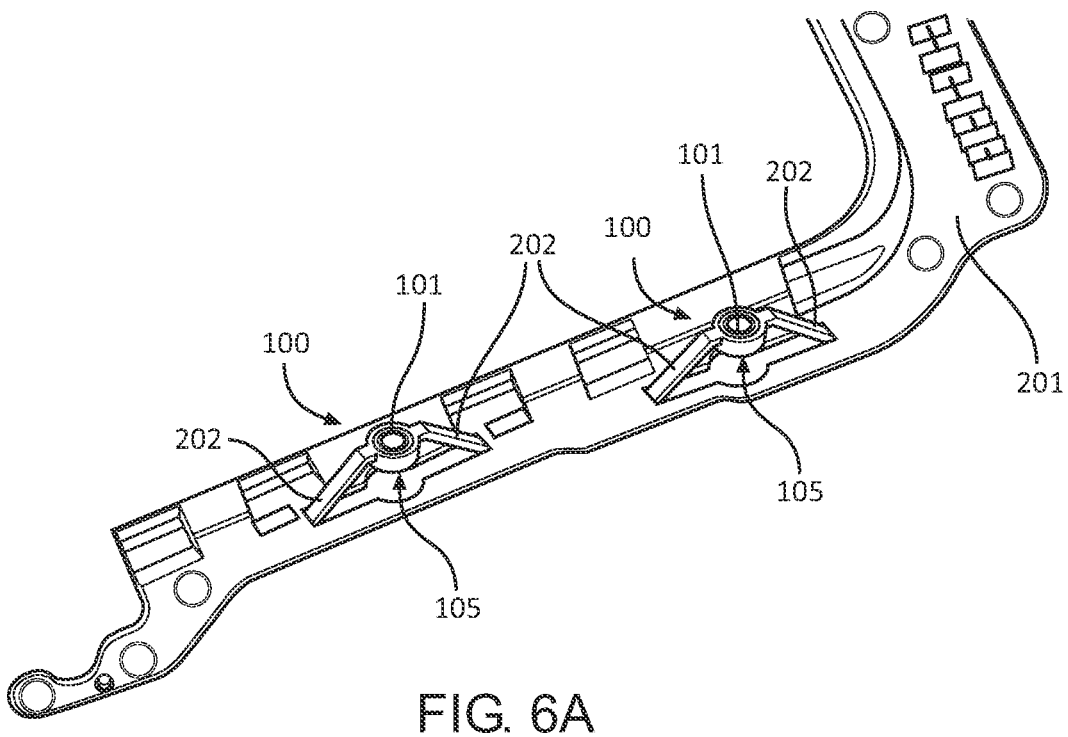
FIG. 6A illustrate magnified perspective views of the magnet assemblies of the present disclosure overmolded within attachment arms positioned within a portion of a panoramic ring.
Figure 6B:
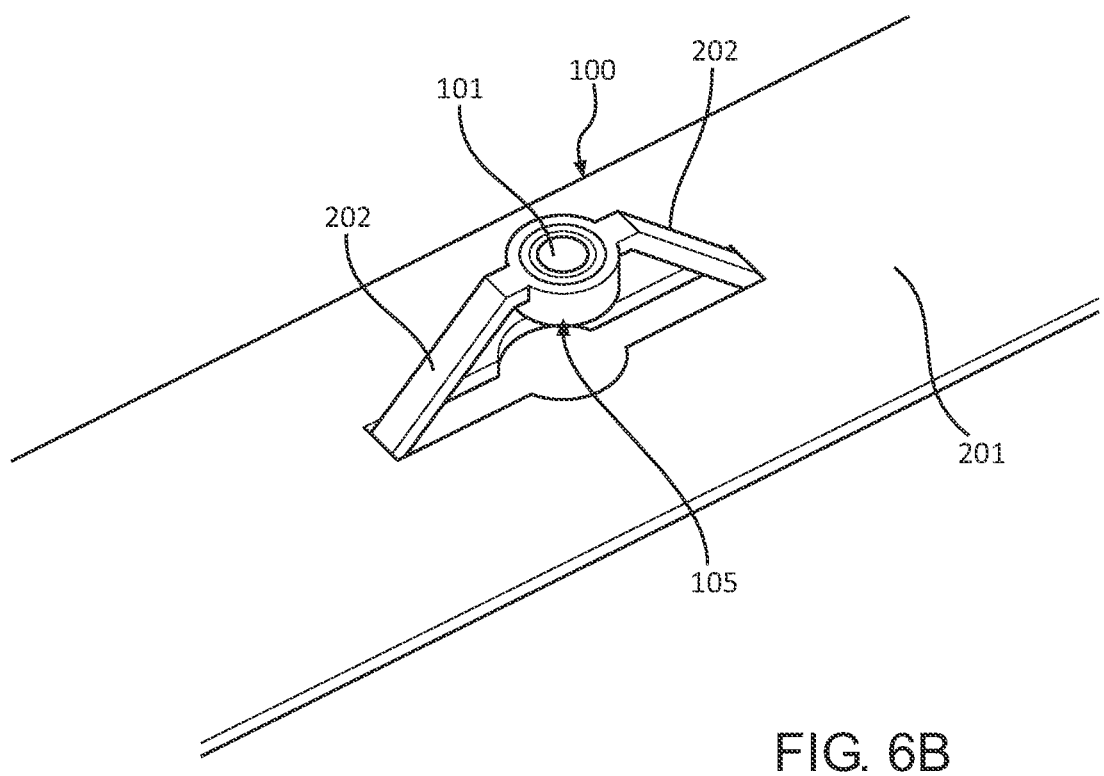
FIG. 6B illustrates a close up of the magnet assembly of FIG. 6A off set from the panoramic ring and overmolded within attachment arms.

FIGS. 6A-6B depict magnified views of magnet assemblies 100 positioned on panoramic ring 201, whereby magnet 101 is positioned within magnet bowl 105. Magnet assembly 100 is secured to panoramic ring 201 by arms 202. In this example, the arms 202 overmolding the magnet assembly 101 are formed in line with adjacent assemblies.

Figure 7A:
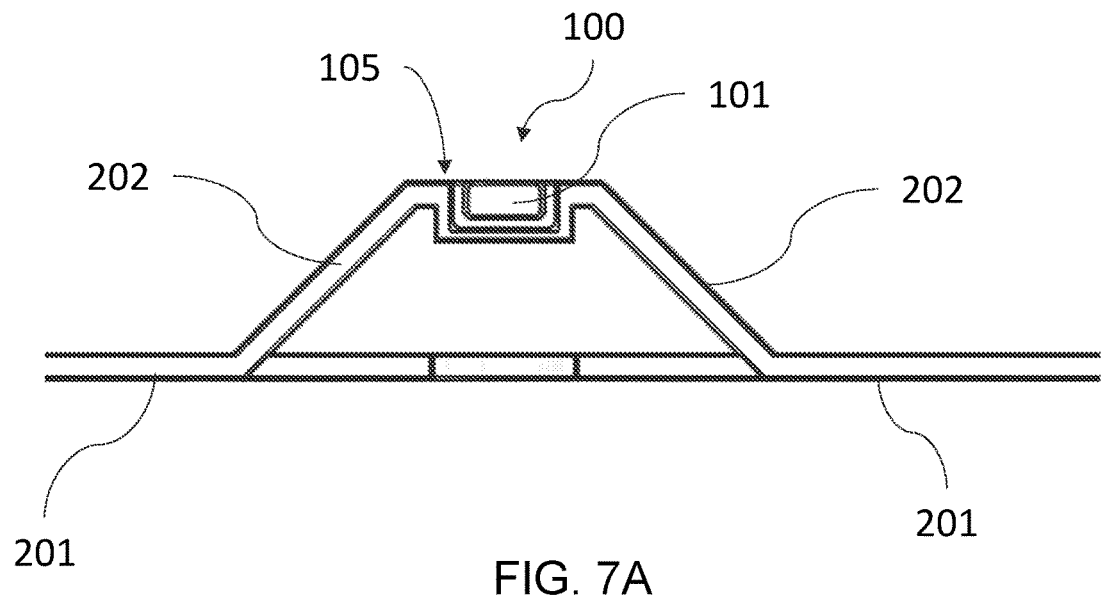
FIG. 7A illustrates a cross-sectional side view of a magnet assembly positioned within a panoramic ring.
Figure 7B:
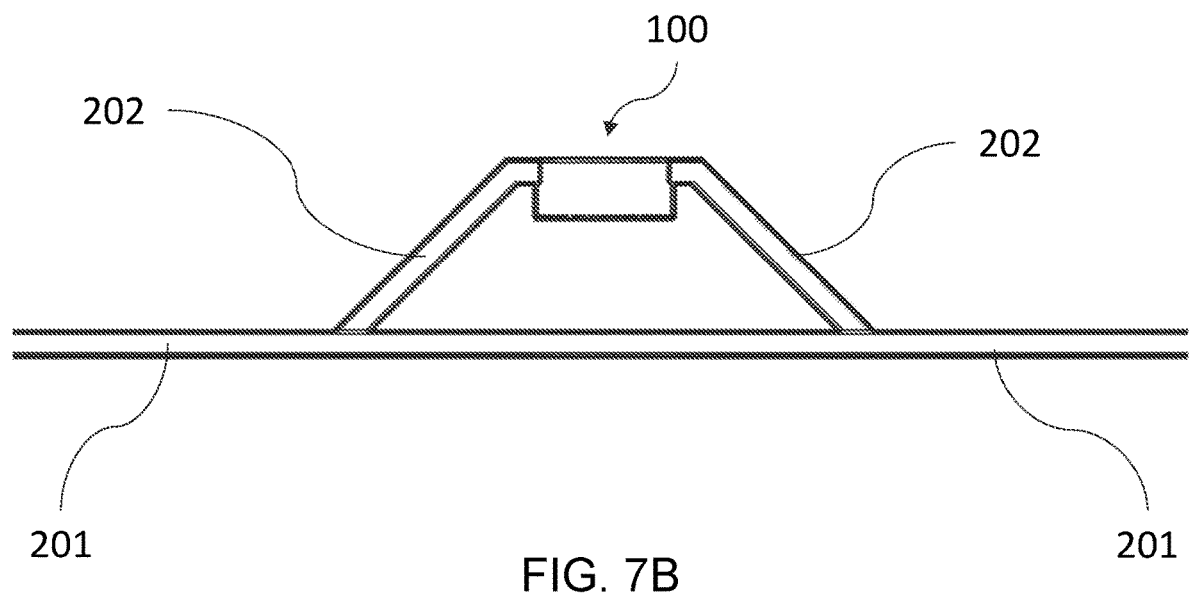
FIG. 7B illustrates the side view of the magnet assembly positioned within the panoramic ring of FIG. 7A.

FIG. 7A illustrates a cross-sectional side view of magnet assembly 100 positioned on panoramic ring 201 whereby magnet 101 is positioned within magnet bowl 105, and magnet assembly 100 is connected to panoramic ring 201 by arms 202. FIG. 7B illustrates a side view of magnet assembly 100 connected to panoramic ring 201 by arms 202.

Figure 8A:
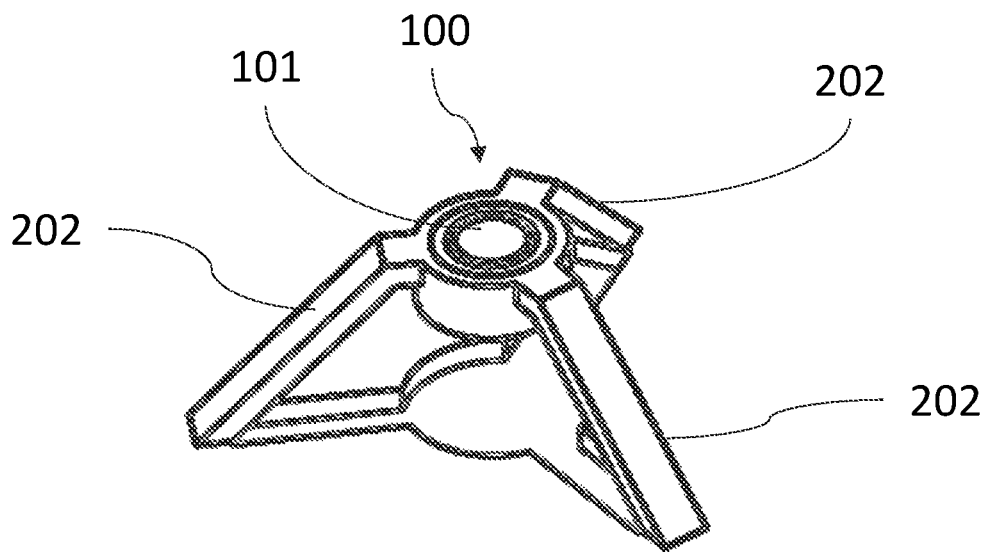
FIGS. 8A-8B illustrate perspective views of an alternative embodiment of magnet assemblies positioned within a three-arm attachment arm configuration.
Figure 8B:
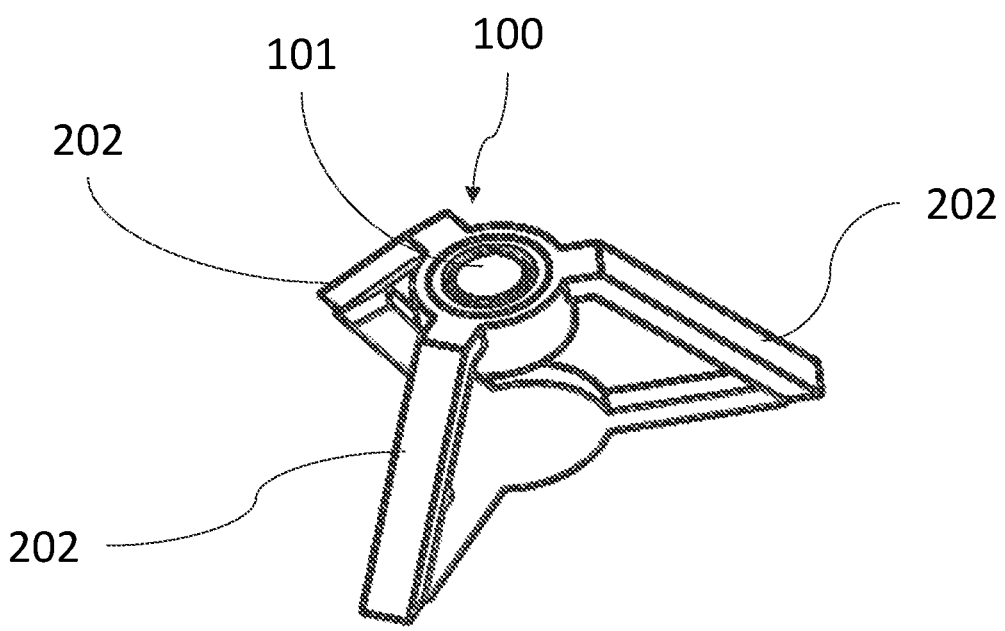

FIGS. 8A-10B provide various examples of the magnet assemblies 100 mounted within arms 202. FIGS. 8A-8B illustrate an example three arm construction forming a tripod embodiment. In this example, the three arms 202 are formed and overmolded to magnet assembly 100 to connect to the panoramic ring. In a further embodiment, four arms can be used to connect magnet assembly to the panoramic ring if it is determined that it would result in a more secure and safe connection of the headliner to the roof of the car.

Figure 9A:
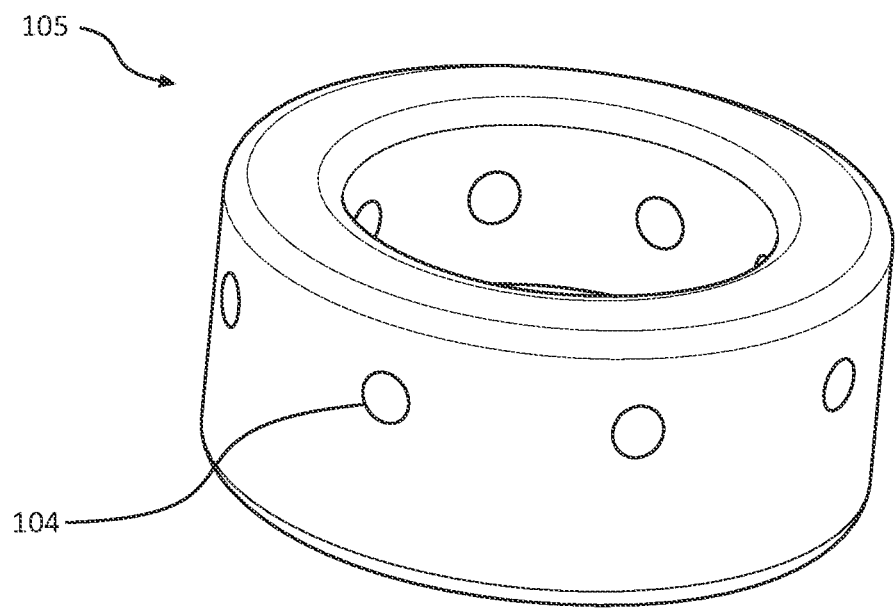
FIG. 9A illustrates a magnet bowl having radial holes positioned throughout a sidewall of a magnet bowl.
Figure 9B:
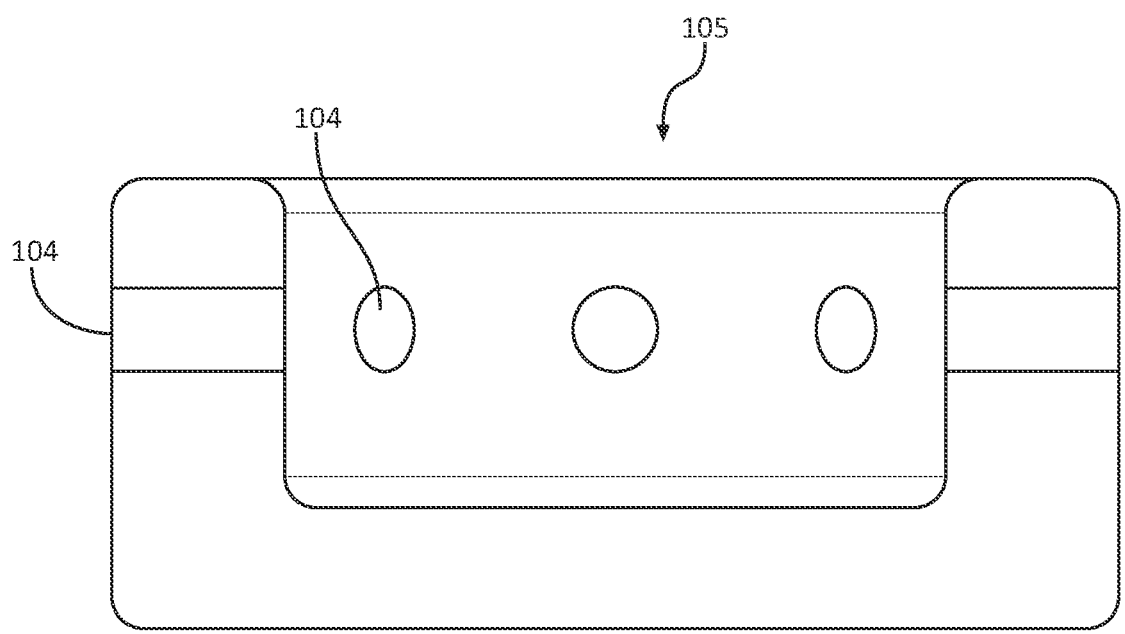
FIG. 9B illustrates a side view of the magnet bowl of FIG. 9A.

FIG. 9A illustrates a perspective view of magnet bowl 105 configured with radial holes 104 positioned throughout magnet bowl 105. This allows for the overmold to fully engage the magnet bowl and magnet during an injection molding and panoramic ring formation step and provide additional connection points for the overmolding material so as to create a stronger connection of magnet assembly 100 to the arms and panoramic ring. FIG. 9B illustrates a cross section side view of magnet bowl 105 configured with radial holes 104 positioned throughout magnet bowl 105.

Figure 10A:
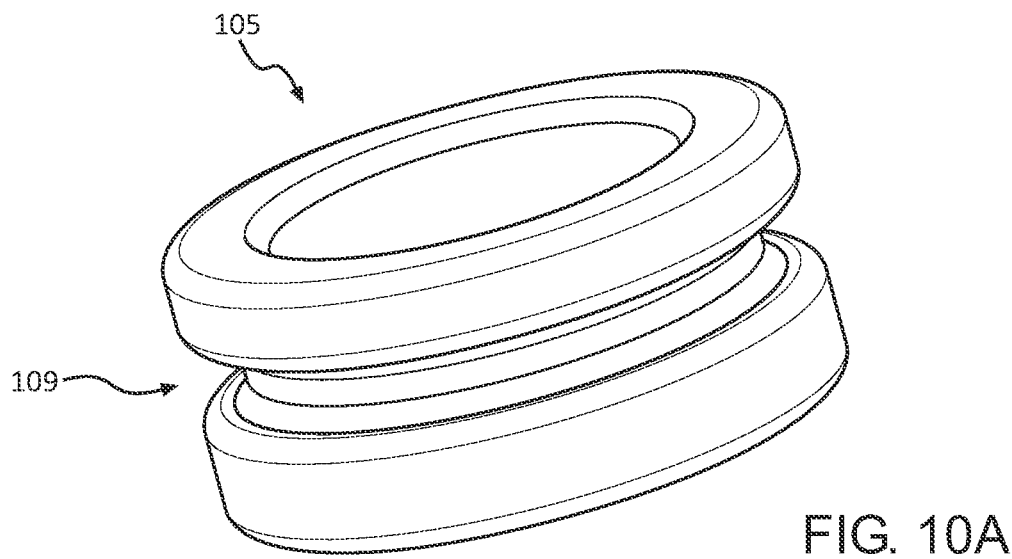
FIG. 10A illustrates a magnet bowl having a radial groove formed on an outer surface of the magnet bowl.
Figure 10B:
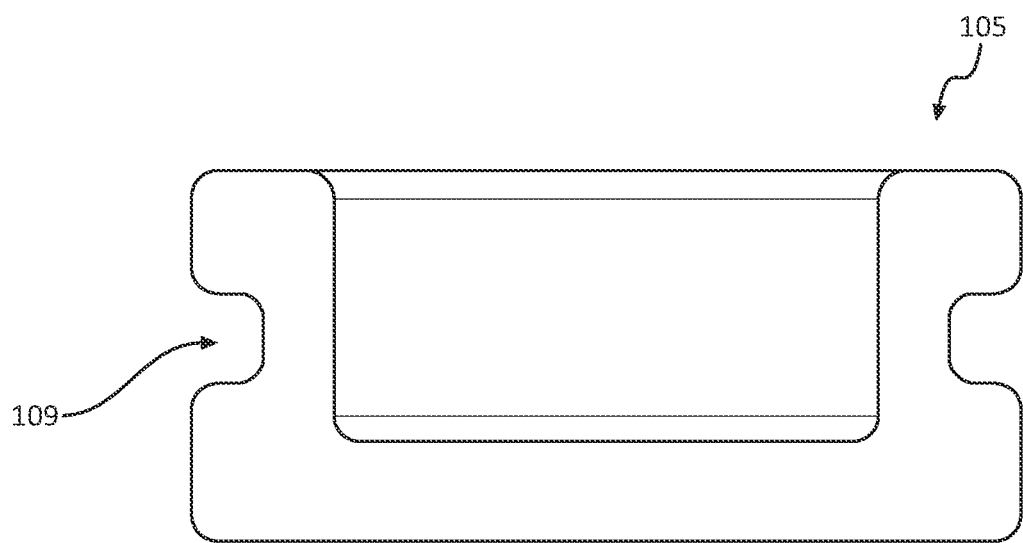
FIG. 10B illustrates a side view of the magnet bowl of FIG. 10A.

FIG. 10A illustrates a perspective view of magnet bowl 105 configured with a radial groove 109 positioned across magnet bowl 105. FIG. 10B illustrates a cross section side view of magnet bowl 105 configured with a radial groove 109 positioned across magnet bowl 105. The radial groove 109 provides additional connection points for the overmolding material so as to result in improved connection of magnet assembly 100 to the arms and panoramic ring.

Figure 11A:
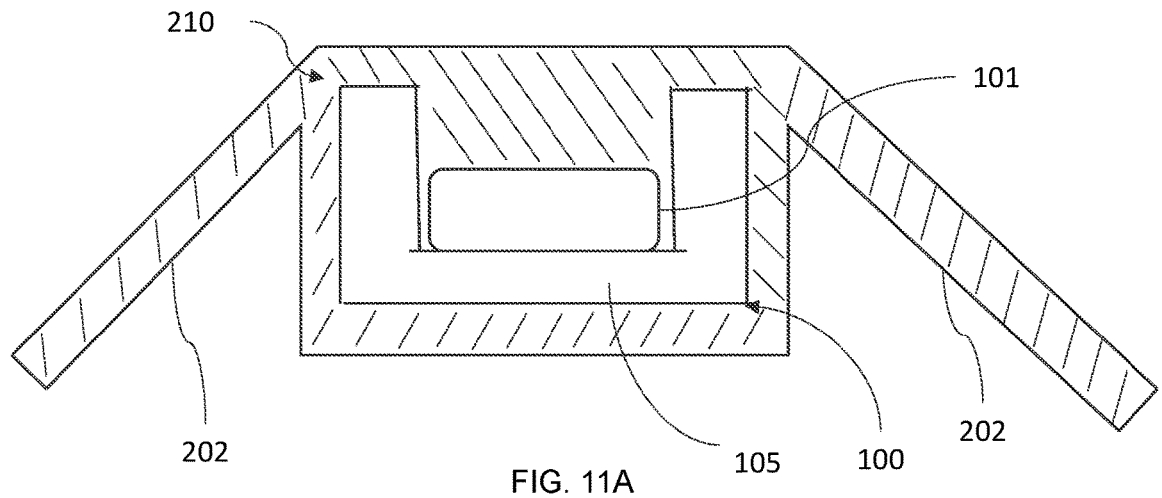
FIG. 11A illustrates a schematic cross section side view of an example magnet assembly positioned within a panoramic ring with overmolding encompassing the entire magnet bowl.
Figure 11B:
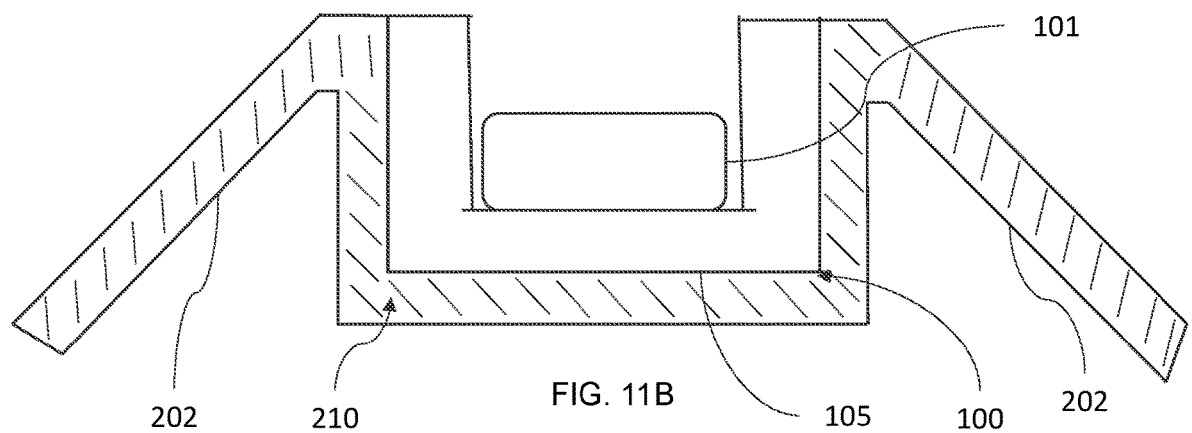
FIG. 11B illustrates a schematic cross section side view of an example magnet assembly positioned within a panoramic ring with overmolding encompassing a bottom portion of the magnet bowl.
Figure 11C:
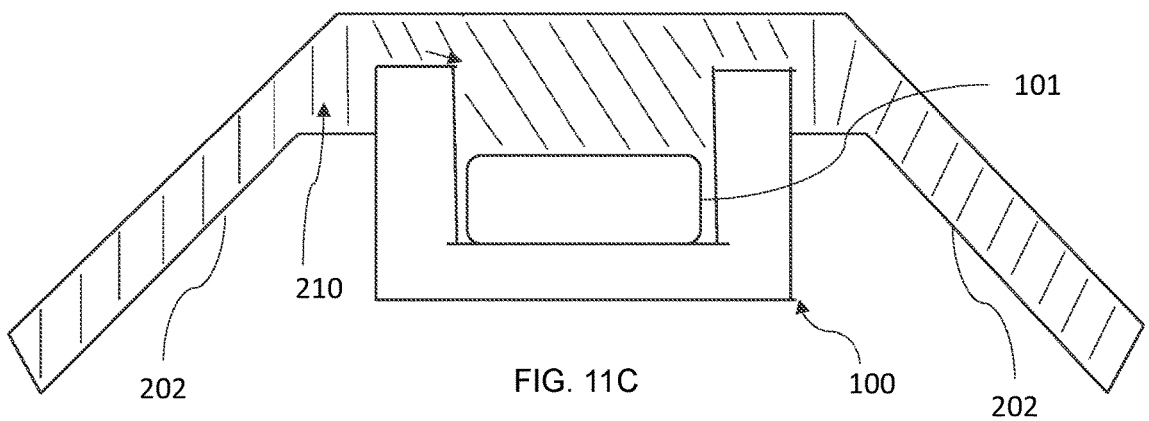
FIG. 11C illustrates a schematic cross section side view of an example magnet assembly positioned within a panoramic ring with overmolding encompassing a top portion of the magnet bowl.

FIGS. 11A-12B illustrate different methods of integrating magnet assembly 100 with panoramic ring 201 and arms 202. The present disclosure provides for a method of overmolding (i.e., injection molding) magnet assembly 100 to integrate it to panoramic ring 201. A mold or tool that provides for the mounting arms 202 to be formed around a pre-inserted magnet assembly 100 is provided. Overmolding is done by heating a polymer material to a temperature where it behaves like a liquid and fills space of a mold or tool before cooling and hardening. In the present disclosure, magnet assembly 100 is overmolded to panoramic ring 201 during the formation of panoramic ring 201 to form one continuous part to ease in the installation and arrangement process. This can be done in die draw. In an example, overmold 210 is made of polymer material. FIG. 11A depicts a cross-sectional view of overmold 210 entirely encompassing magnet assembly 100 so that it is completely covered by the panoramic ring 201 and out of view. The overmold forms a layer surrounding the magnet that is thin enough so that the magnet can still function as intended and engage with the roof of the vehicle. FIG. 11B depicts overmold 210 encompassing a bottom portion of magnet assembly 100 so that only a top portion of magnet assembly 100 is exposed. FIG. 11C depicts overmold 210 encompassing a top portion of magnet assembly 100 so that only a bottom portion of magnet assembly 100 is exposed. The overmold forms a layer that is thin enough so that the magnet can still interact with the roof of the vehicle.

Figure 12A:
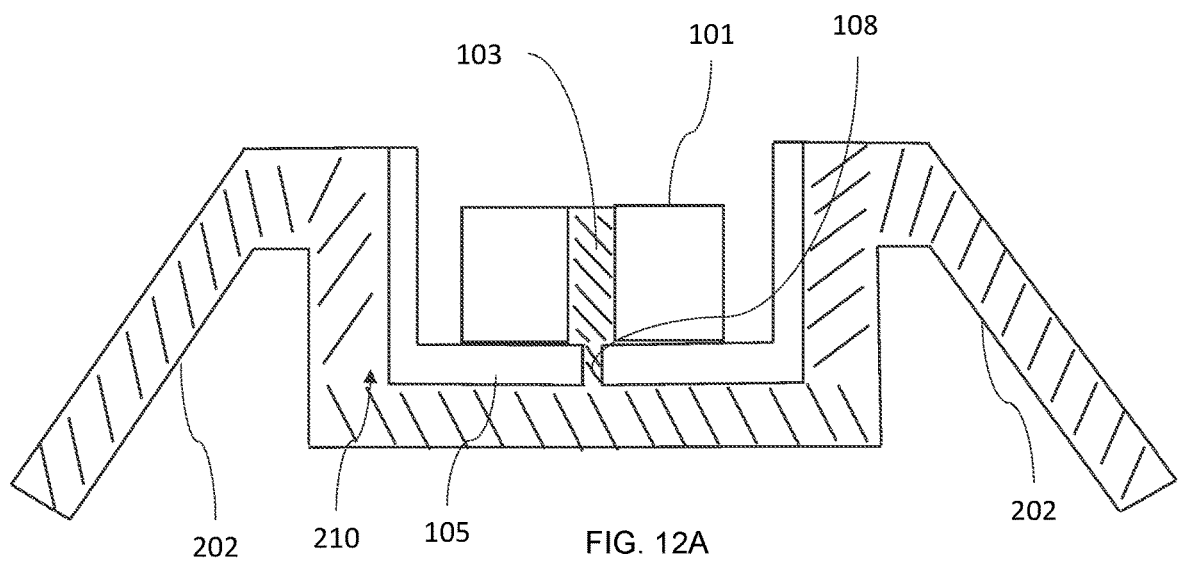
FIG. 12A illustrates a schematic cross section side view of a magnet assembly configured with a center hole and the overmolding encompassing a bottom portion of the magnet assembly.
Figure 12B:
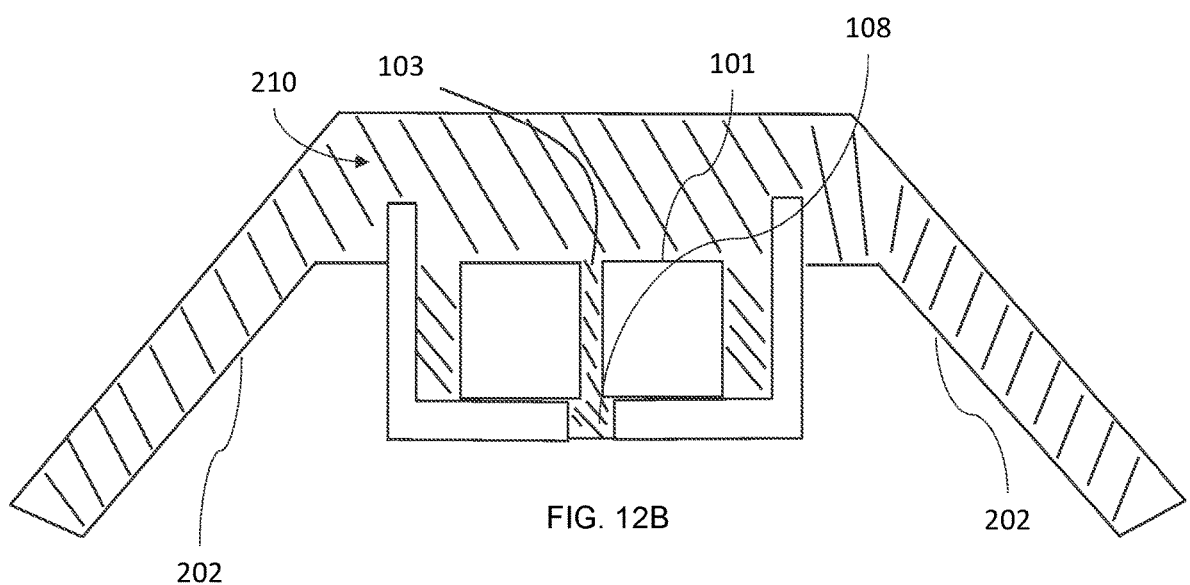
FIG. 12B illustrates a schematic cross section side view of a magnet assembly configured with a center hole and the overmolding encompassing a top portion of the magnet assembly.

FIGS. 12A-12B illustrate overmolding of the magnet assembly 100 whereby the magnet 101 and magnet bowl 105 include aligned center holes 110 to allow for a more secure overmold of magnet assembly 100 with panoramic ring 201. FIG. 12A depicts magnet assembly 100 defining center magnet hole 103 and center magnet bowl hole 108. In this embodiment, center magnet hole 103 defines a wider width than center magnet bowl hole 108. Overmold 210 encompasses a bottom portion of magnet assembly 100 and enters through center magnet bowl hole 108 and into center magnet hole 103. The wider width of center magnet hole 103 as compared to center magnet bowl hole 108 creates additional strength and tension for overmold 210 so as to better secure the magnet assembly. This functions to trap the magnet bowl within the overmold. Arms 202 then form and connect the overmold 210 and magnet assembly 100 to the panoramic ring 201. FIG. 12B depicts magnet assembly 100 with center magnet hole 103 and center magnet bowl hole 108, but overmold 210 encompasses the top portion of magnet assembly 100 and enters through center magnet hole 103 and into center magnet bowl hole 108. In this embodiment, center magnet bowl hole 108 defines a wider width than center magnet hole 103. The wider width of center magnet bowl hole 108 as compared to center magnet hole 103 secures the magnet bowl and creates additional strength and tension for overmold 210 so as to better secure the magnet assembly. Arms 202 then connect the overmold 210 and magnet assembly 100 to the panoramic ring 201.

Figure 13A:
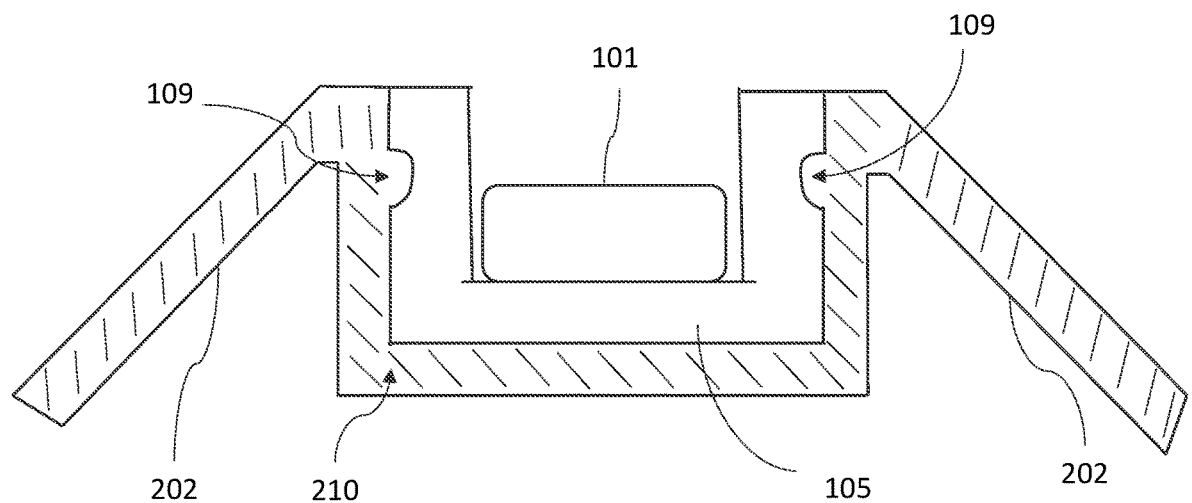
FIG. 13A illustrates a schematic cross section side view of a magnet assembly configured with a radial groove and the overmolding encompassing a side and bottom portion of the magnet assembly.
Figure 13B:
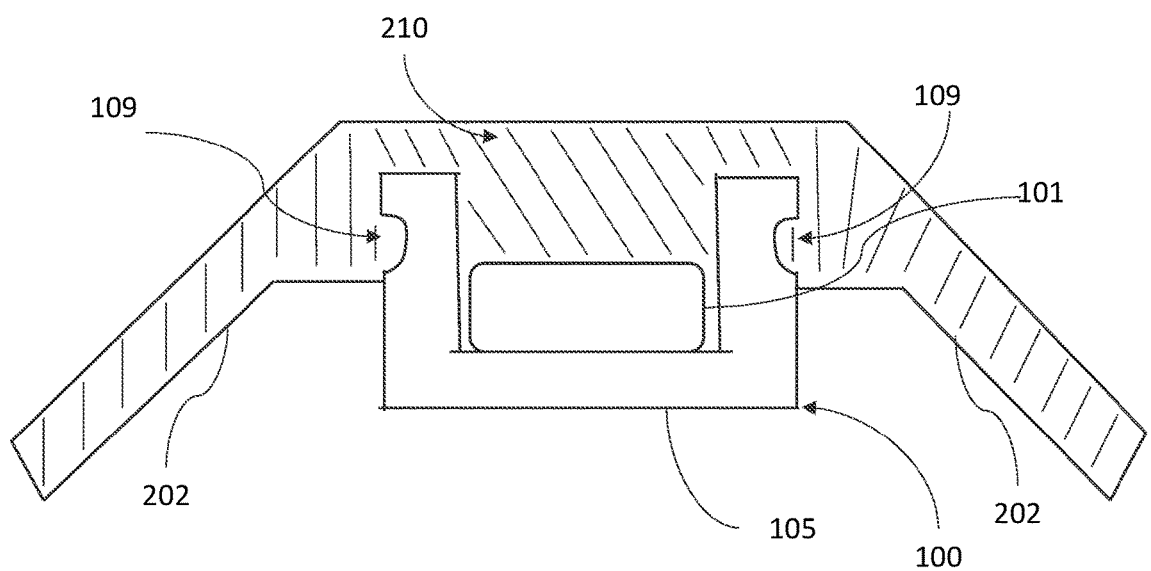
FIG. 13B illustrates a schematic cross section side view of a magnet assembly configured with a radial groove and the overmolding encompassing a side and top portion of the magnet assembly.

FIGS. 13A-13B illustrate overmolding of the magnet assembly 100 whereby the magnet 101 and magnet bowl 105 include aligned radial groove to allows for a more secure overmold of the magnet assembly 100 and the panoramic ring 201. FIG. 13A depicts magnet assembly 100 defining radial magnet groove 109. Overmold 210 encompasses a bottom portion of magnet assembly 100 and fill through radial groove 109. Attachment arms 202 then connect the overmold 210 and magnet assembly 100 to the panoramic ring 201. FIG. 13B depicts magnet assembly 100 with radial groove 109, but overmold 210 encompasses the top portion of magnet assembly 100 and fills through radial groove 109. Arms 202 then connect the overmold 210 and magnet assembly 100 to the panoramic ring 201.

Figure 14A:
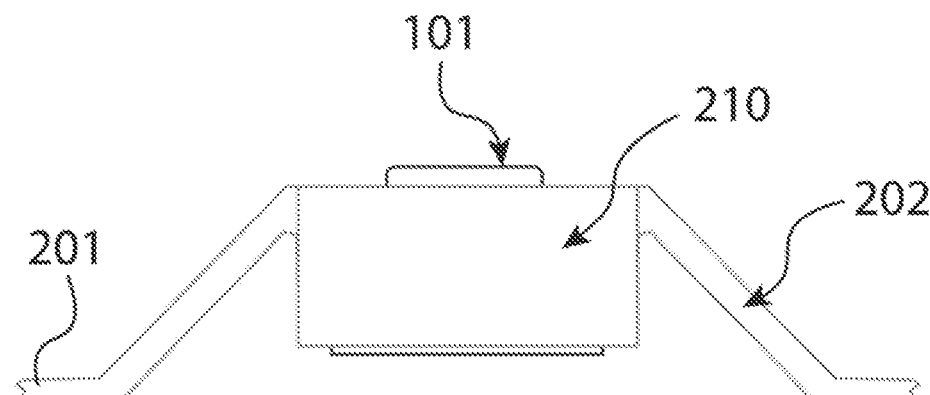
FIG. 14A illustrates a schematic side view of a magnet assembly configured with overmolding encompassing the sides of a magnet assembly having a radial groove.
Figure 14B:
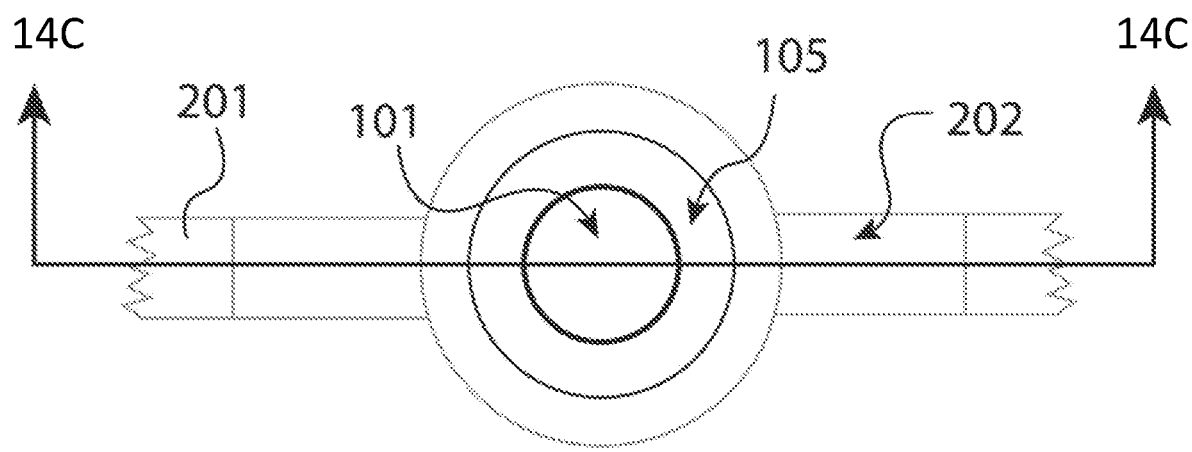
FIG. 14B illustrates a top view of the magnet assembly configured with overmolding encompassing the sides of the magnet assembly as shown in FIG. 14A.
Figure 14C:
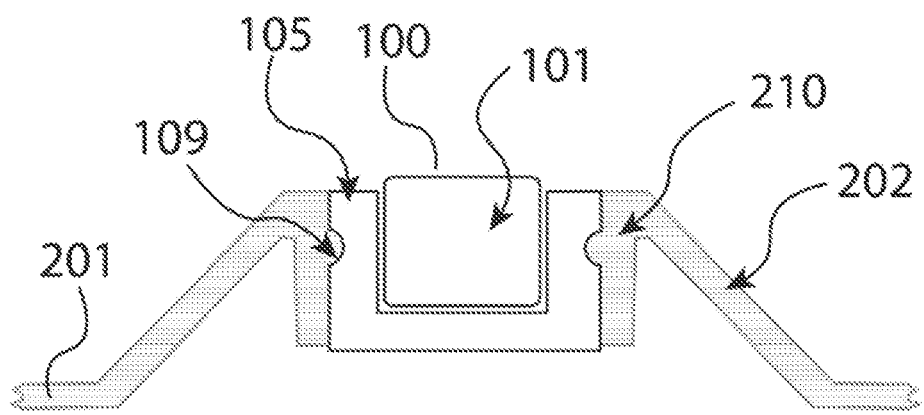
FIG. 14C illustrates a cross section view along 14C-14C of the magnet assembly configured with overmolding encompassing the sides of the magnet assembly as shown in FIG. 14A.
Figure 15A:
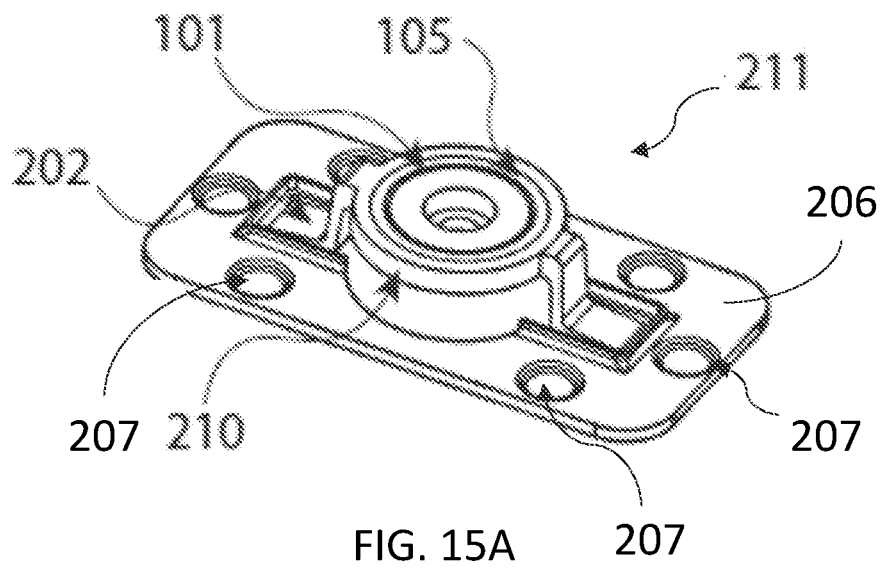
FIG. 15A illustrate an exemplary perspective view of an attachment clip positioned overmolding a magnet assembly affixed to an attachment base.
Figure 15B:
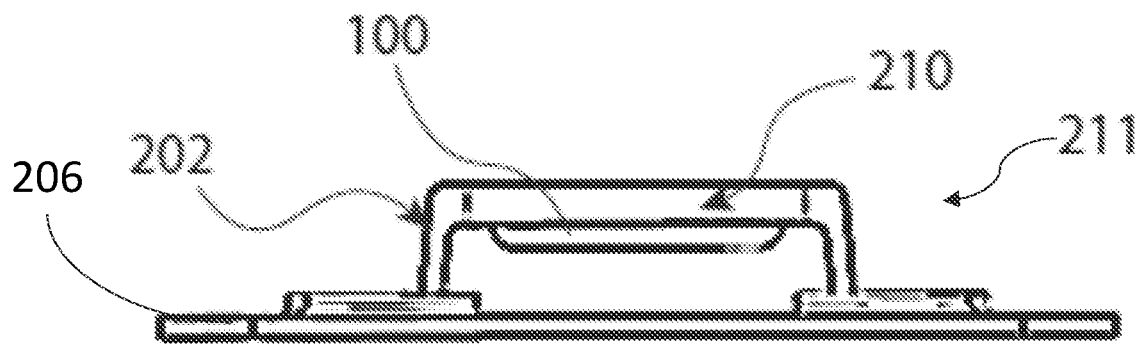
FIG. 15B is an elongated side view of the attachment clip of FIG. 15A.
Figure 15C:
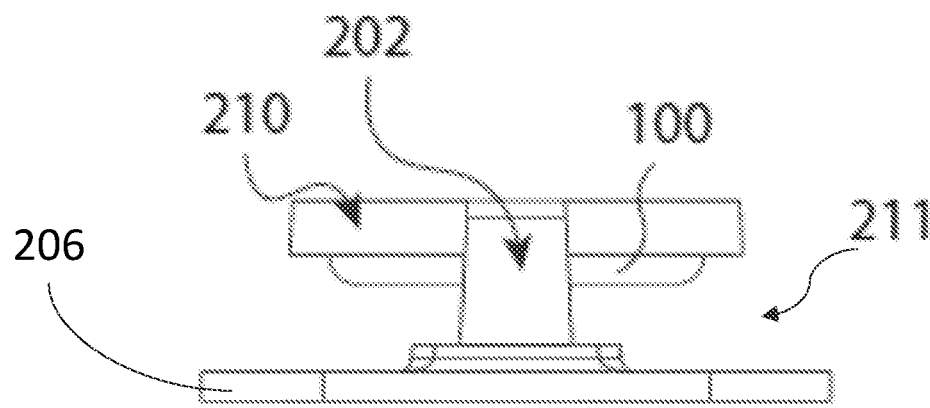
FIG. 15C is a front side view of the attachment clip of FIG. 15A.
Figure 15D:
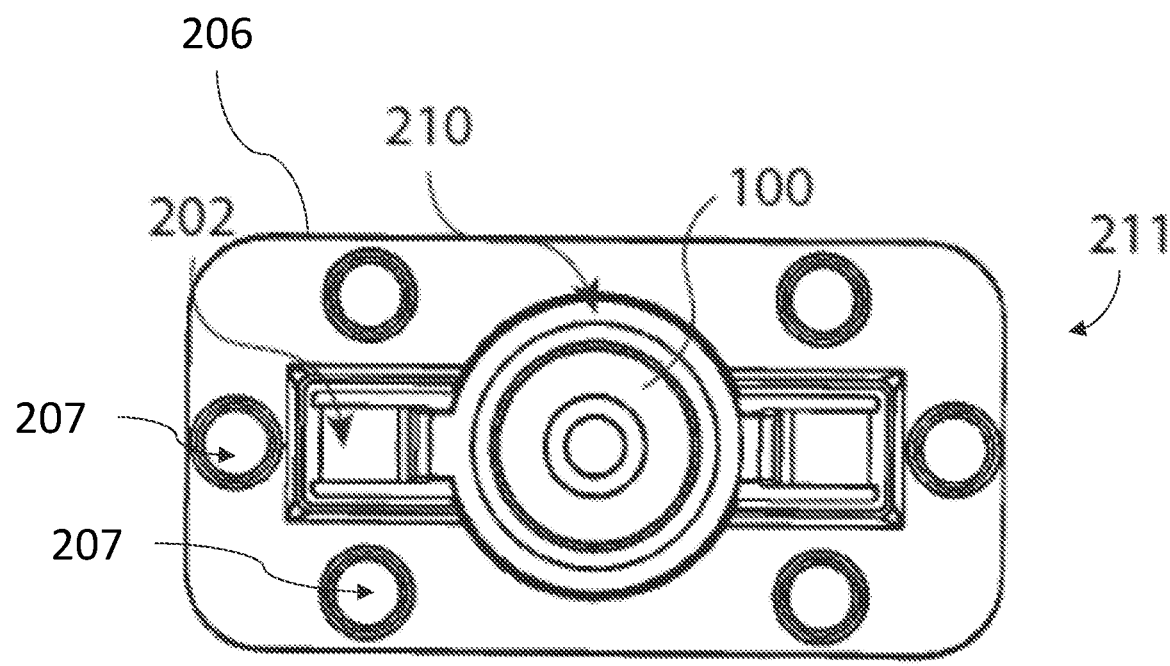
FIG. 15D is a bottom view of the attachment clip of FIG. 15A.
Figure 15E:
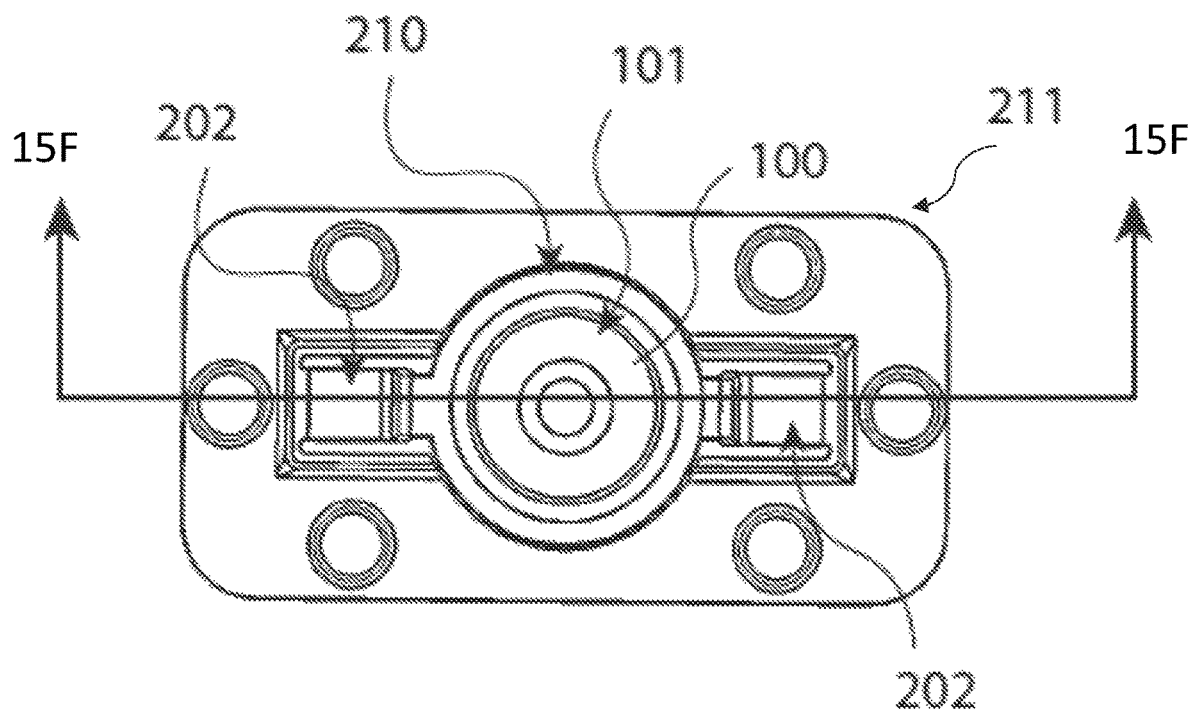
FIG. 15E is a top view of the attachment clip of FIG. 15A.
Figure 15F:
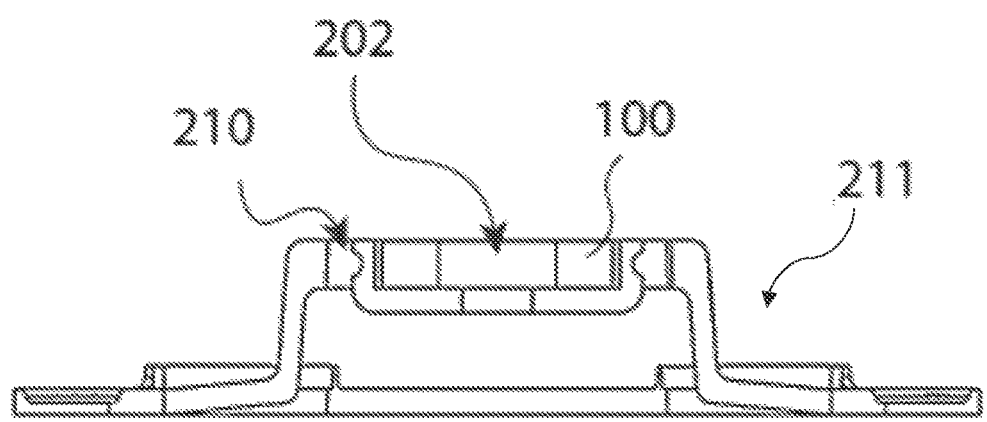
FIG. 15F is a cross section view across 15F-15F of FIG. 15E.
Figure 16A:
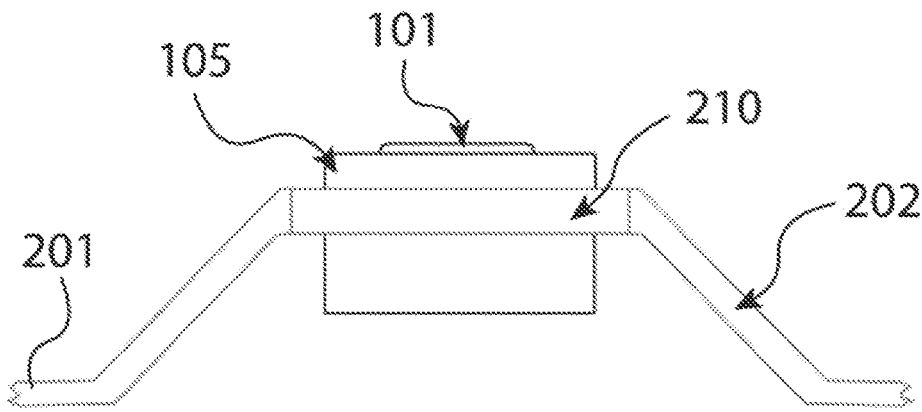
FIG. 16A illustrates a schematic view of an attachment clip having a magnet assembly configured with overmolding engaging the magnet assembly through a radial groove.
Figure 16B:
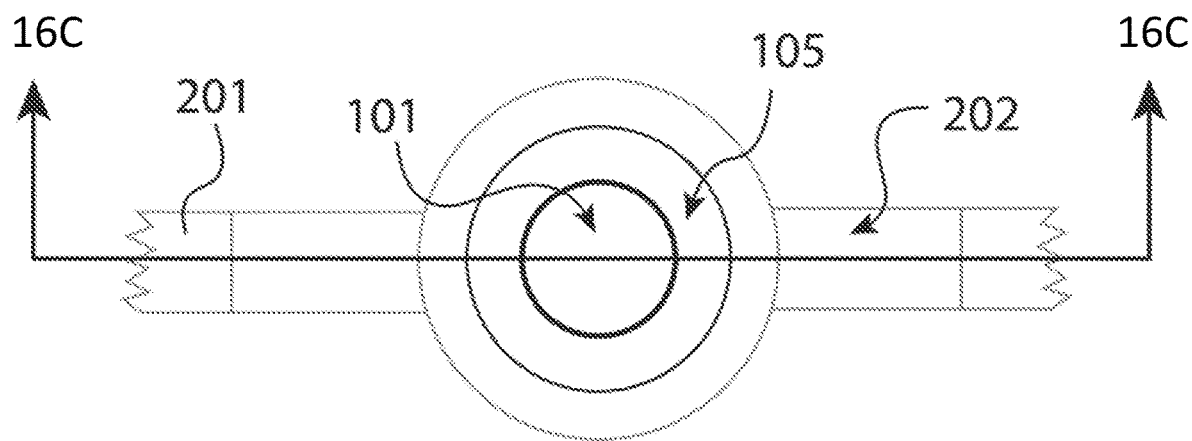
FIG. 16B illustrates a top view of the attachment clip of FIG. 16A.
Figure 16C:
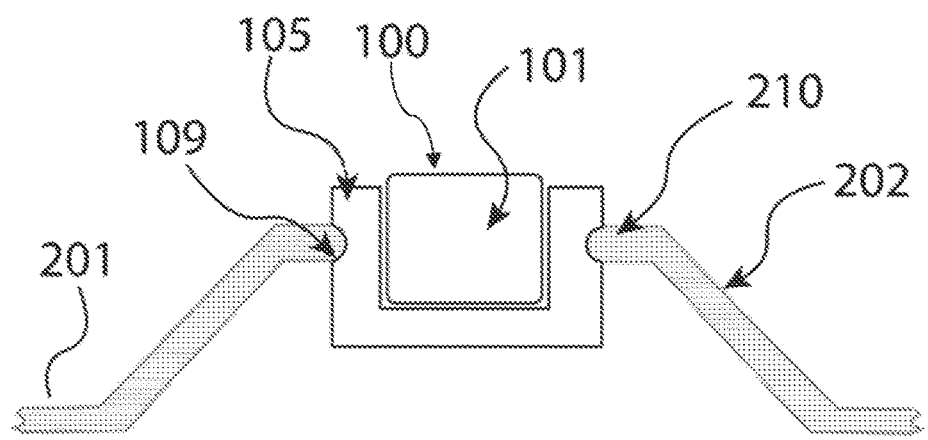
FIG. 16C illustrates a cross section view across 16C-16C of FIG. 16B.

FIGS. 14A-14C and FIGS. 16A-17C illustrate magnet assembly 100 whereby magnet 101 and magnet bowl 105 are configured with overmold 210 across sides of the magnet assembly 100. These assemblies 100 with a portion of a panoramic ring 201 and arms 202 can be done using die draw absent any additional tooling. The presence of the attachment arms allows for the part to be made in die draw without the need for expensive and complicated tooling. Moreover, the arms allow for better articulation of the magnet because it is stepped off a base part. Arms 202 connect overmold 210 and magnet assembly 100 to the panoramic ring 201. In the example of FIGS. 14A-14C, the overmold 210 encompasses most or all of the sides of magnet assembly 100. The bottom of magnet bowl 105 and top of magnet 101 are not encased in the overmold 210. The exposed magnet allows the magnet to engage with a roof of a vehicle. In this example, magnet bowl 105 is configured with a radial groove 109 formed around a perimeter of magnet bowl 105. The radial groove provides additional connection points for the overmolding material so as to secure magnet assembly 100 to arms 202 and panoramic ring 201. FIGS. 16A-16C depict an overmold 210 encompassing only a small portion around a perimeter of magnet bowl 105.

Figure 17A:
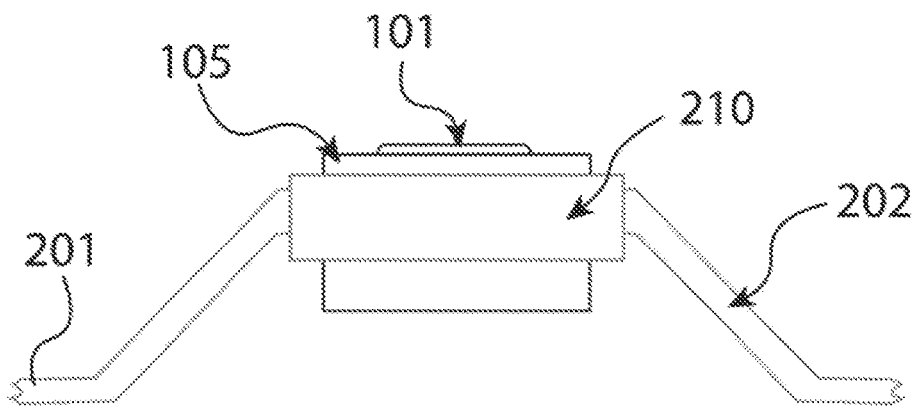
FIG. 17A illustrates a schematic view of an attachment clip having a magnet assembly configured with overmolding over the sides of the magnet assembly and radial holes.
Figure 17B:
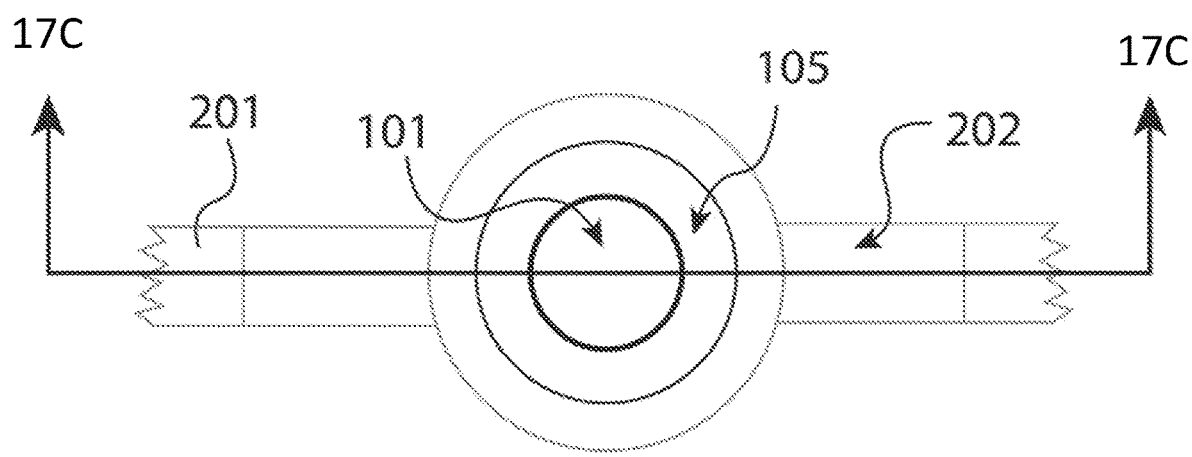
FIG. 17B illustrates a top view of the attachment clip of FIG. 17A.
Figure 17C:
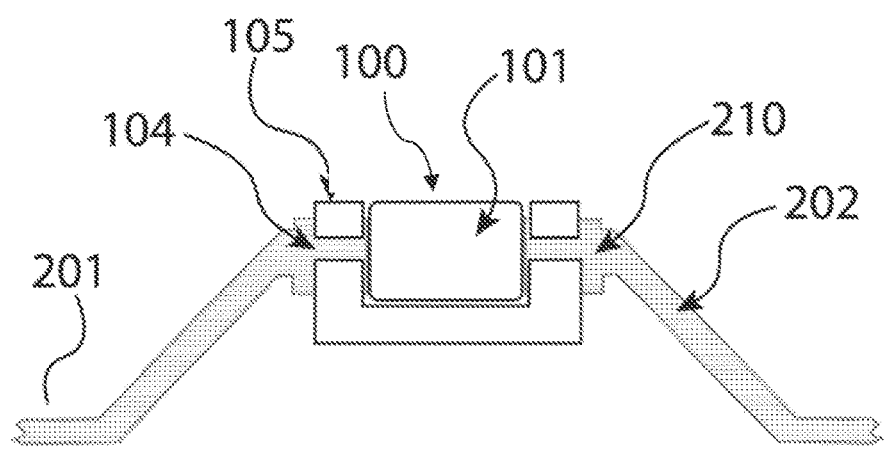
FIG. 17C illustrates a cross section view across 17C-17C of FIG. 17B.
Figure 25:
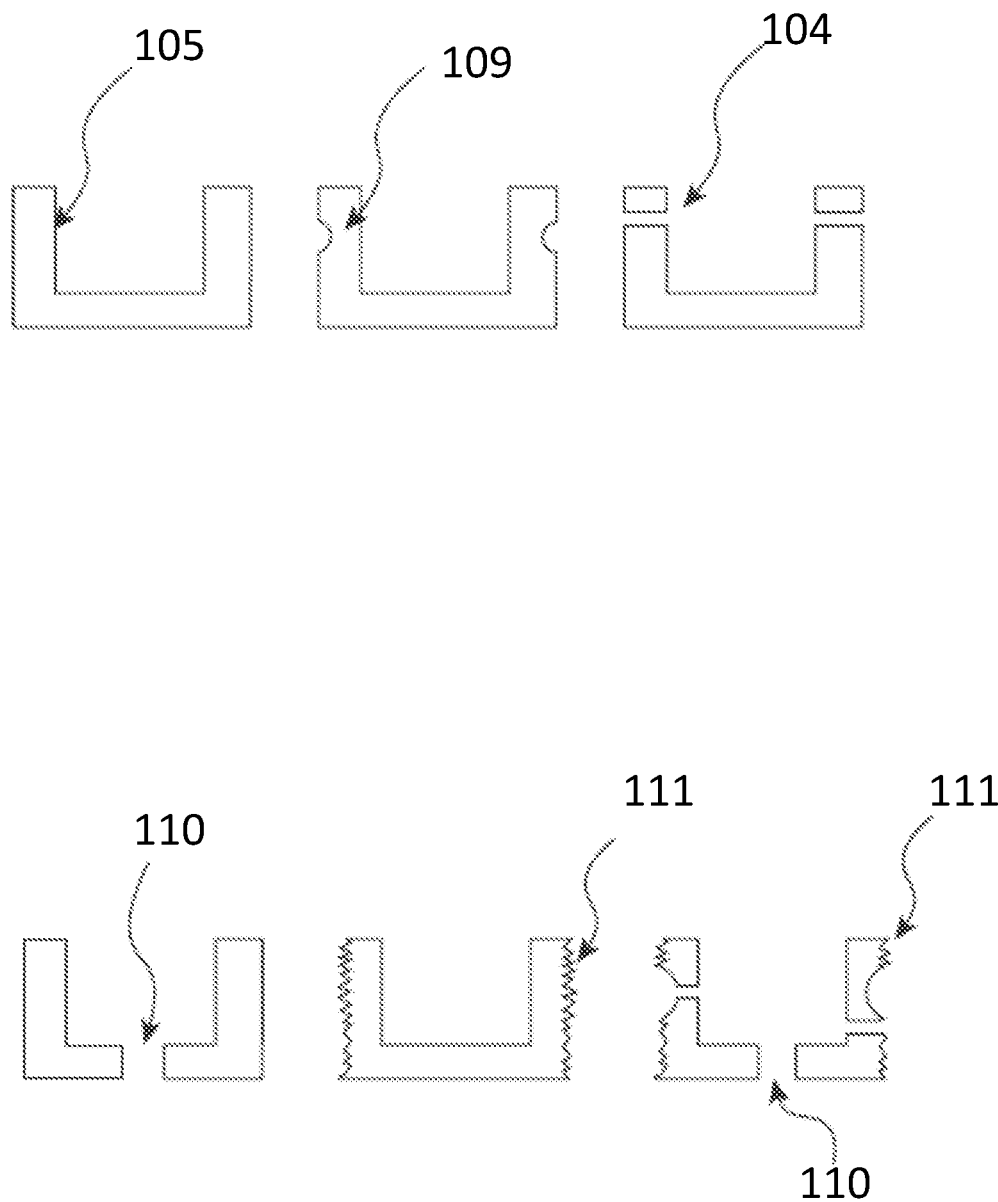
FIG. 25 illustrates various embodiments of magnet bowls within a magnet assembly having a variety of engagement features.
Figure 26A:
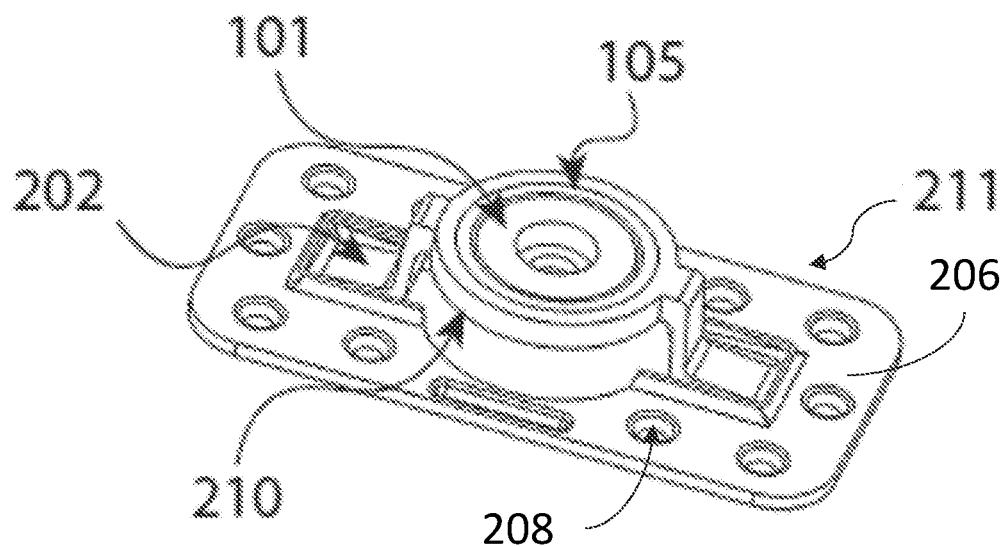
FIG. 26A illustrate an exemplary perspective view of an attachment clip positioned overmolding a magnet assembly affixed to an attachment base.
Figure 26B:
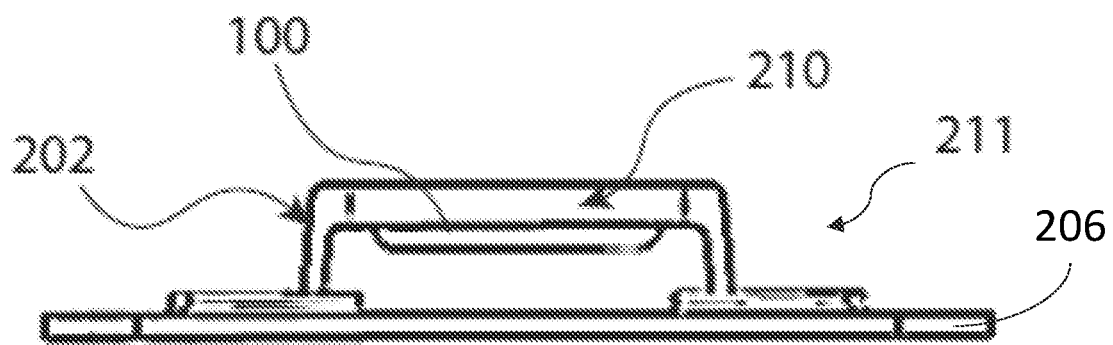
FIG. 26B is an elongated side view of the attachment clip of FIG. 26A.
Figure 26C:
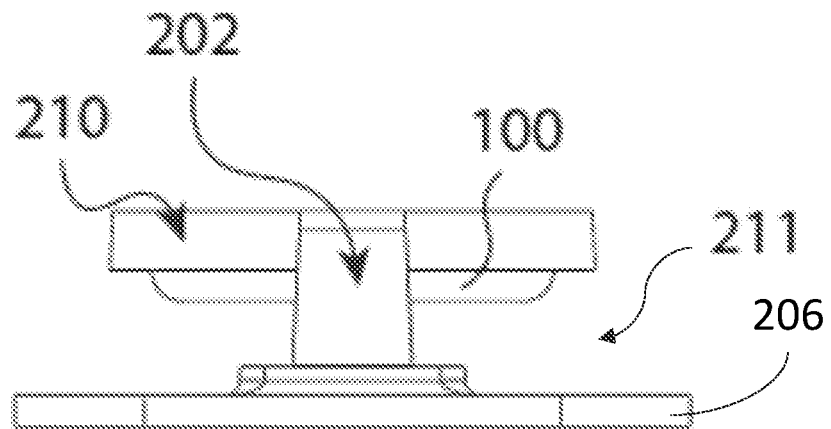
FIG. 26C is a front side view of the attachment clip of FIG. 26A.
Figure 26D:
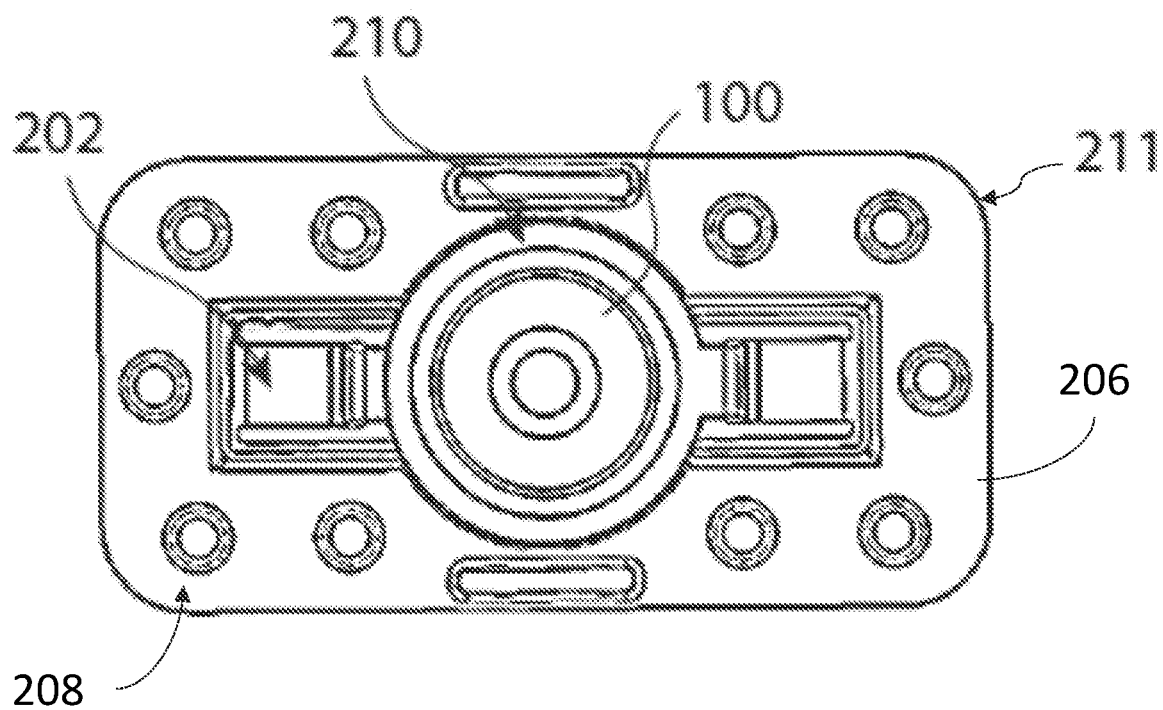
FIG. 26D is a bottom view of the attachment clip of FIG. 26A.
Figure 26E:
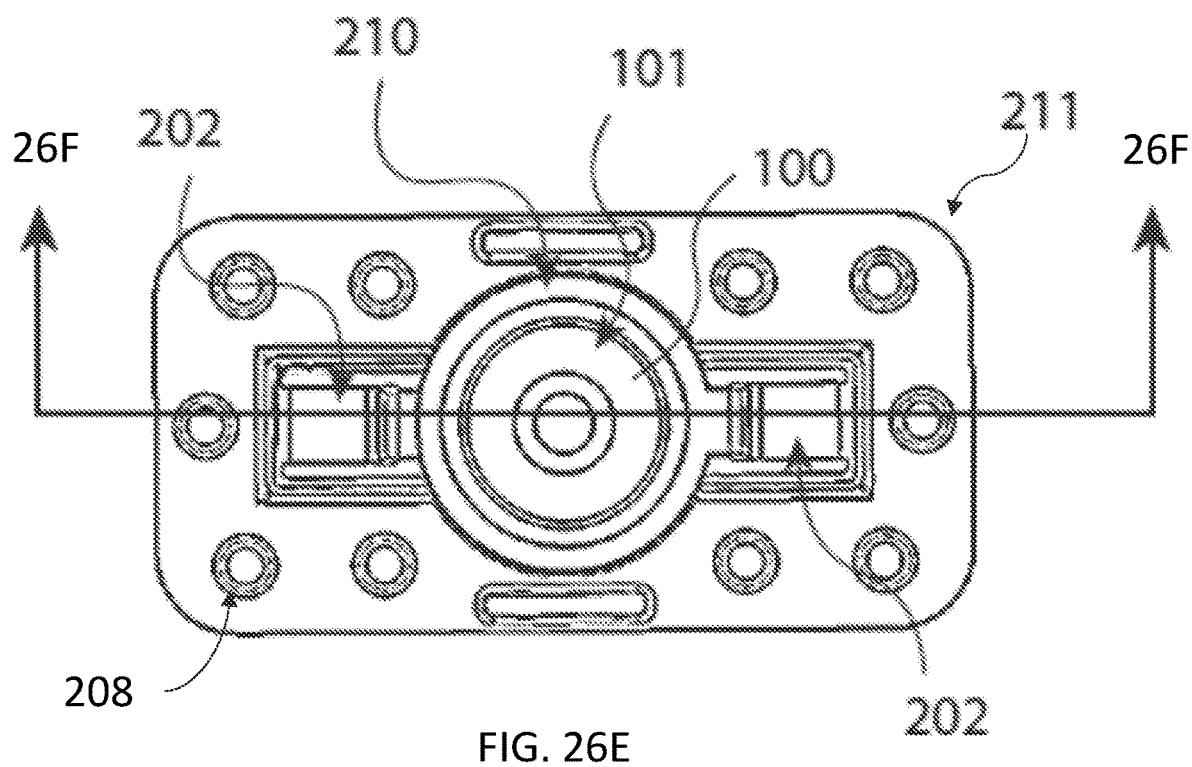
FIG. 26E is a top view of the attachment clip of FIG. 26A.
Figure 26F:
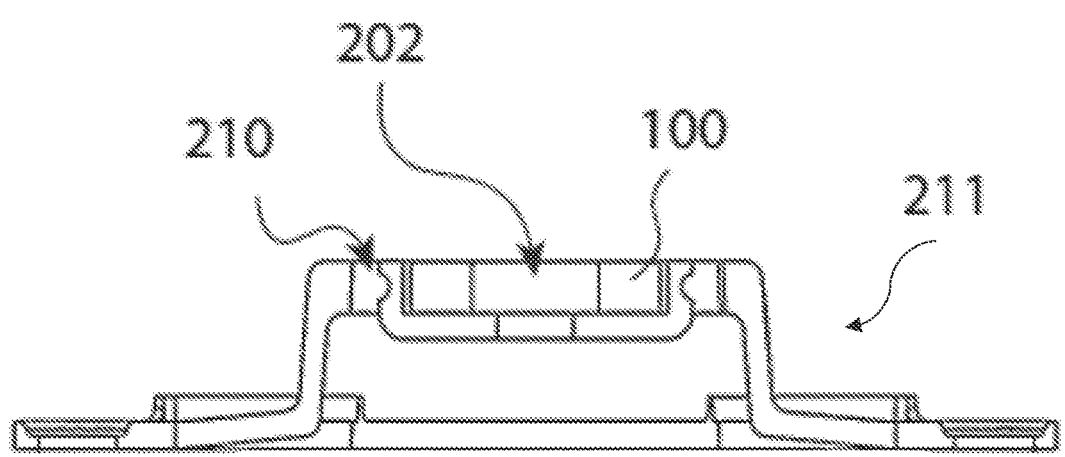
FIG. 26F is a cross section view across 26F-26F of FIG. 26E.

In a further example, as depicted in FIGS. 17A-17C, the overmold 210 encompasses a broader portion around the perimeter of magnet assembly 100. In this example, magnet bowl 105 is configured with radial holes 104 so as to provide additional connection points for the overmold and to secure magnet assembly 100 to the arms 202 and panoramic ring 201. In yet a further example, magnet bowl 105 is configured with a knurled outer surface 111 as shown in FIG. 25 so as to provide for a more secure bonding for the overmold.

FIGS. 15A-15F, FIG. 18, and FIGS. 26A-26F illustrate various embodiments of an attachment clip 211. The attachment clip 211 is configured with a magnet assembly 100 and an attachment base 206. The attachment base 206 is configured to affix to a decorative panel (like 203 from FIG. 2), and the magnet assembly 100 is oriented to engage with a magnet attachment surface. When the magnet assembly 100 engages with the magnet attachment surface, the decorative panel is tightly secured in place in an easy and secure connection process. In an example, the decorative panel is a headliner; the magnet attachment surface is any interior surface of a vehicle such as a roof or a trunk.

In this example, attachment clip 211 is configured with an attachment base 206 that affixes to a headliner 203. As shown in FIGS. 15A-15F, the attachment base 206 can be glued to the headliner 203 where glue enters within holes 207 positioned around the attachment base 206 and interacts with the decorative panel.

In a further example, as shown in FIGS. 26A-26F, the attachment base is welded to the headliner 203 through a process known as "sonic welding" or "ultrasonic welding". Sonic weld pads are formed for melting and attaching the part 211 to a desired surface of a decorative feature or substrate. The attachment base 206 is configured with plastic discs 208 around the attachment base sufficient to support the attachment clip 211 to a desired substrate or decorative feature. When the plastic discs 208 are positioned near the headliner and exposed to high-frequency ultrasonic acoustic vibrations, the plastic forms a solid-state weld with the headliner, securing the attachment clip 211 to the headliner.

Figure 18:
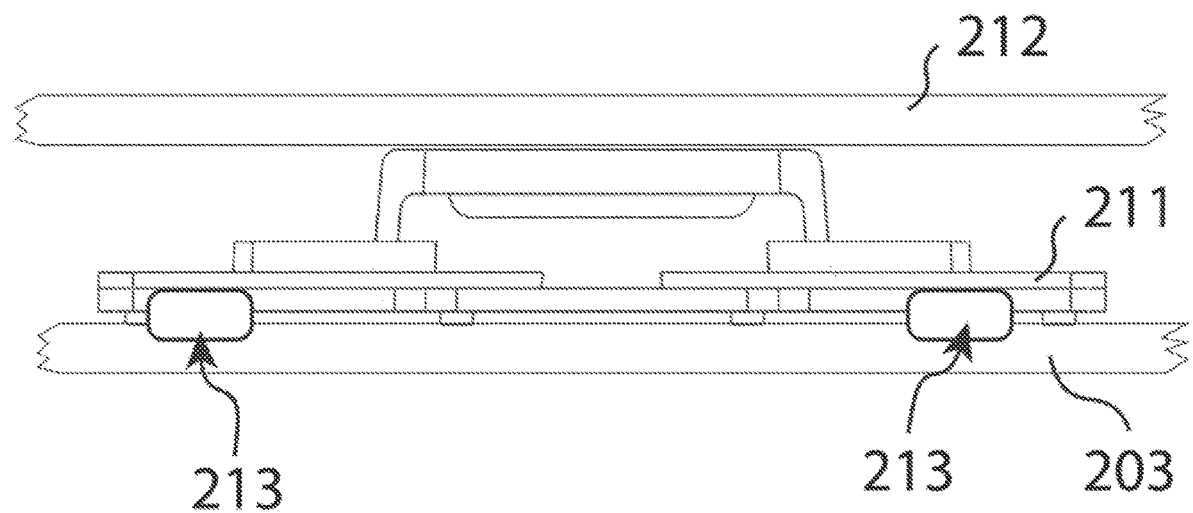
FIG. 18 illustrates a side view of an attachment clip with an attachment base positioned on a headliner and a magnet assembly secured to a roof of a vehicle.
Figure 19:
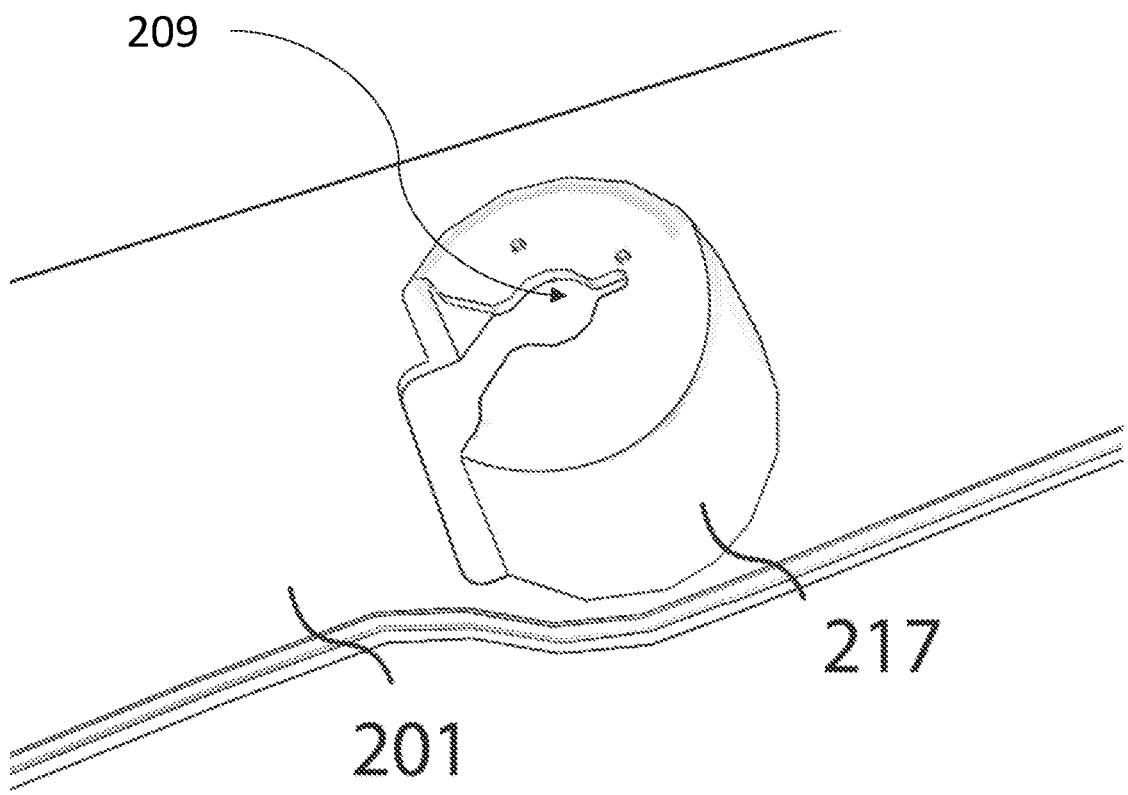
FIG. 19 illustrates a perspective view of a doghouse affixed to a headliner.

In yet another example, as shown in FIG. 18, attachment clip is affixed to the headliner 203 via secondary attachment 213 which clips the attachment base to the headliner 203 and secures the attachment clip 211 in place. Affixing the attachment clip 211 directly to the headliner 203 with the magnet assembly 100 directed towards a roof of a vehicle allows for the easy assembly of attaching the headliner to the roof while also providing a secure and tight connection. The vehicle can be an automobile, truck, boat, or airplane or any other vehicle having a roof and a headliner.

The attachment base is connected to magnet assembly 100 by attachment arms 202 whereby attachment arms 202 connect to overmold 210 which encompasses magnet assembly 100. Magnet assembly 100 is configured with magnet 101 within magnet bowl 105 so that magnet 101 rests within magnet bowl 105 and faces out towards roof 212. In one embodiment, the attachment clip 211 and magnet assembly 100 can be manufactured in die draw without the need for additional tooling or secondary action. The presence of the two or more attachment arms can allow for the part to be made in die draw without the need for expensive and complicated tooling or secondary action. Without the arms, to make a part in die draw would require a prohibitively expensive and large mold to accommodate a part. Following injection molding, the tool can then be opened in such a way so that the attachment clip and magnet assemblies are removed from the tool without causing damage to the attachment clip, magnet assemblies, or tool. The attachment clip allows for easy assembly and secure connection of the headliner to the roof of the vehicle.

FIGS. 19-24F depict the various embodiments of the pressure fit clip 214 that secures a headliner or substrate 201 of a headliner configured with a doghouse 217 to the roof of a vehicle. A doghouse 217 is a circular housing that is affixed to a headliner or panoramic ring 201. Clips are affixed to a roof of a vehicle. Traditionally, the doghouses on the headliner or panoramic ring are then carefully aligned with the clips and inserted into the doghouses to secure the headliner to the roof. This process is a complex and delicate procedure to affix the headliner and often leads to an unsecure connection. An unsecure connection of the headliner is a dangerous malfunction for a moving vehicle. Further, an unsecure connection leads to rattling, squeaking, and banging of the headliner against the roof of the vehicle. In the present example, pressure fit clip 214 engages with doghouse 217 so that magnet assembly 100 within pressure fit clip 214 is exposed to the roof of the vehicle, thereby affixing headliner 203 or panoramic ring 201 to the roof of the vehicle magnetically.

Figure 20A:
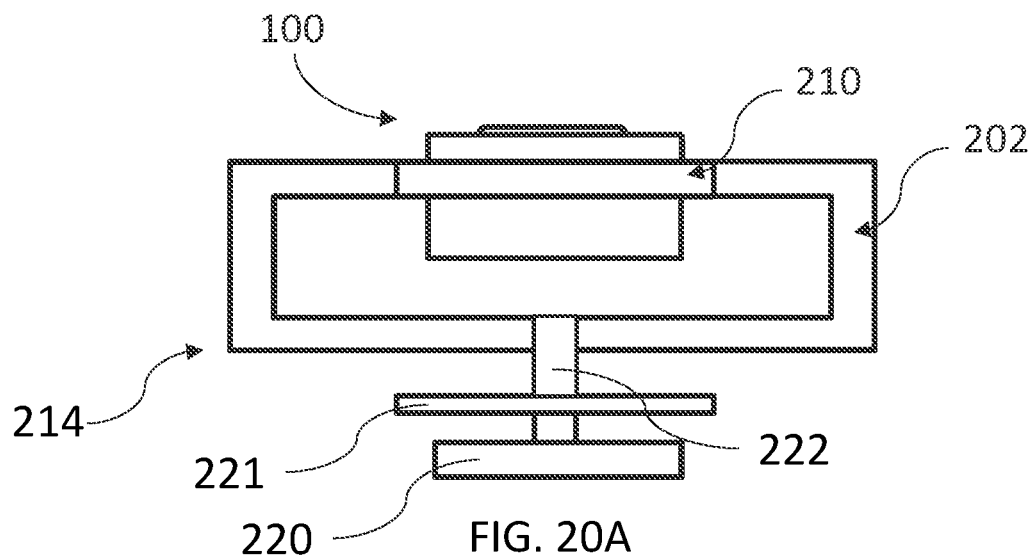
FIG. 20A illustrates a schematic view of a pressure fit clip with a bottom base, an engagement disk, attachment arms in a "U" configuration and a magnet assembly configured with a radial groove.
Figure 20B:
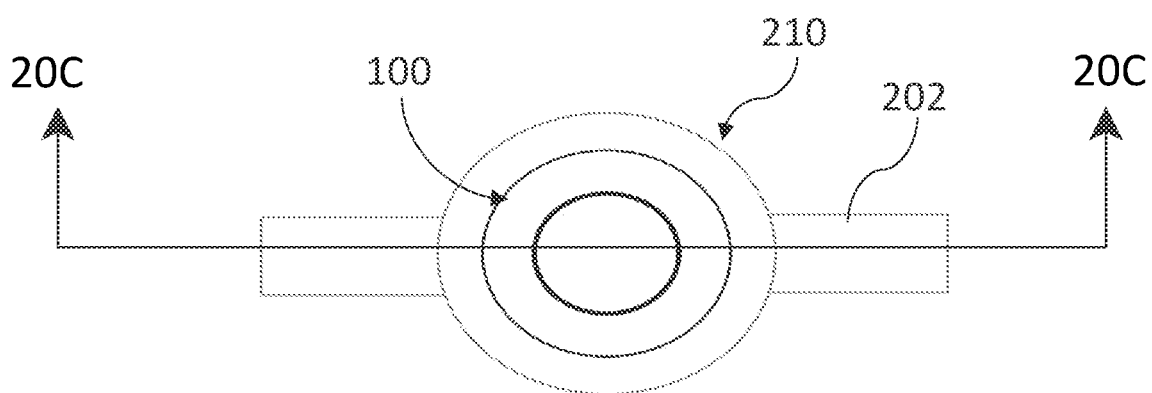
FIG. 20B illustrates a top view of the pressure fit clip of FIG. 20A.
Figure 20C:
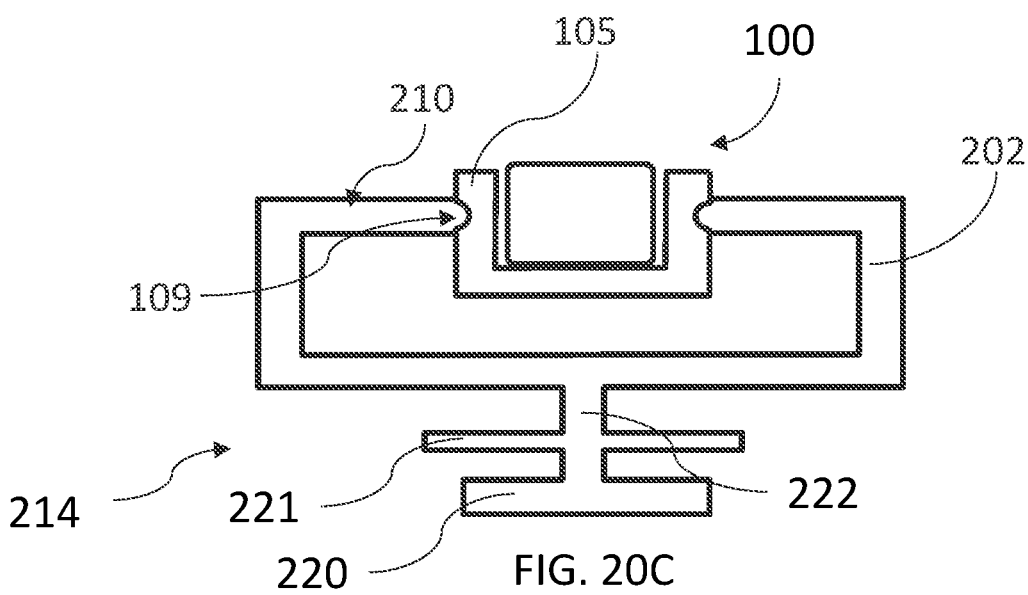
FIG. 20C illustrates a cross section view across 20C-20C.

Referring to FIGS. 20A-20C, pressure fit clip 214 is configured with a bottom base 220 connected to an engagement disk 221 positioned above the bottom base 220 and relatively parallel with bottom base 220. Attachment arms 202 extend upward and outwardly from the engagement disk 221 traversing outward and creating a "U" configuration before securely overmolding with the magnet assembly 100. The "U" configuration of the attachment arms 202 allows for articulation and flexibility of the pressure fit clip 214 so that it can be manipulated in different directions to better connect to a magnet attachment surface and any contoured or uneven surface.

The increased articulation eases the assembly and connection process of a decorative panel and substrate and creates a more secure connection for improved safety. In an example, the substrate is a panoramic ring; the decorative panel is a headliner; the magnet attachment surface is any interior surface of a vehicle such as a roof or a trunk. Further, the pressure clip 214 and magnet assembly 100 can be manufactured in die draw without the need for additional tooling or secondary action. The presence of attachment arms allows for the part to be made in die draw without the need for expensive and complicated tooling or secondary action. Without the arms, to make a part in die draw would require a prohibitively expensive and large mold to accommodate a part. Following injection molding, the tool can then be opened in such a way so that the pressure fit clip and magnet assemblies are removed from the tool without causing damage to the attachment clip, magnet assemblies, or tool. This avoids the need for any additional expensive and time-consuming tooling.

The attachment arms 202 connect to magnet assembly 100 through overmold 210. Bottom base 202 and engagement disk 221 engage with doghouse 217 by inserting through an aperture 209 of the doghouse 217. The engagement disk 221 inserts within the aperture 209 and then is secured in place and locked from moving out of place. A post 222 extends up from the bottom base 220 and through the aperture of the doghouse 217 before forming the attachment arms 202 that extend out and away to form the essentially "U" configuration before engaging the magnet assembly 100. The attachment arms 202 then align to the aperture on the top of the doghouse 217 and traverse out of the doghouse 217 and secure the magnet assembly 100 above the doghouse 217. In this example, the overmold 210 engages groove 109 of the magnet assembly 100. The magnet assembly 100 magnetically engages a magnetic attachment surface of a roof of a vehicle and thereby connects the headliner to the roof of the vehicle. The magnet assembly 100 can further define an engagement feature, like a groove 109, to engage with overmold 210 to further ensure a secure overmold and engagement.

Figure 21A:
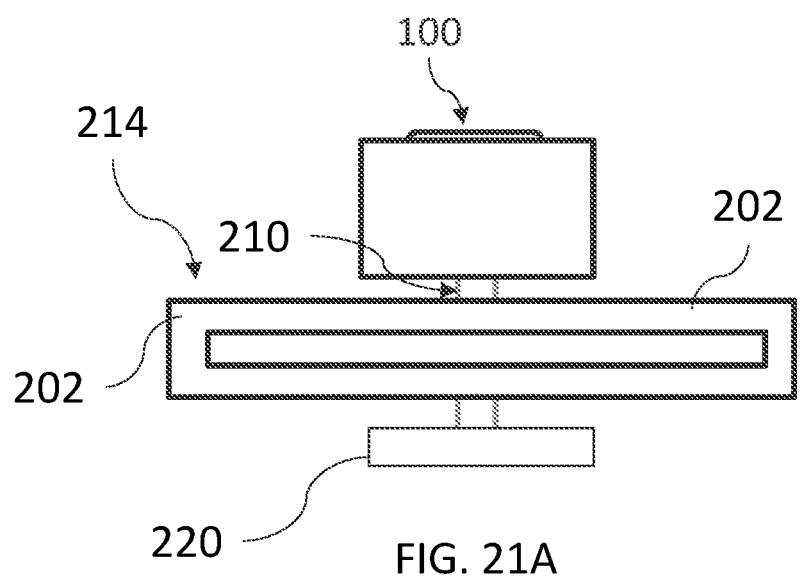
FIG. 21A illustrates a schematic view of a pressure fit clip with a bottom base, with no engagement disc, attachment arms extending wider than a width of the magnet assembly and overmolding a magnet assembly configured with a center hole.
Figure 21B:
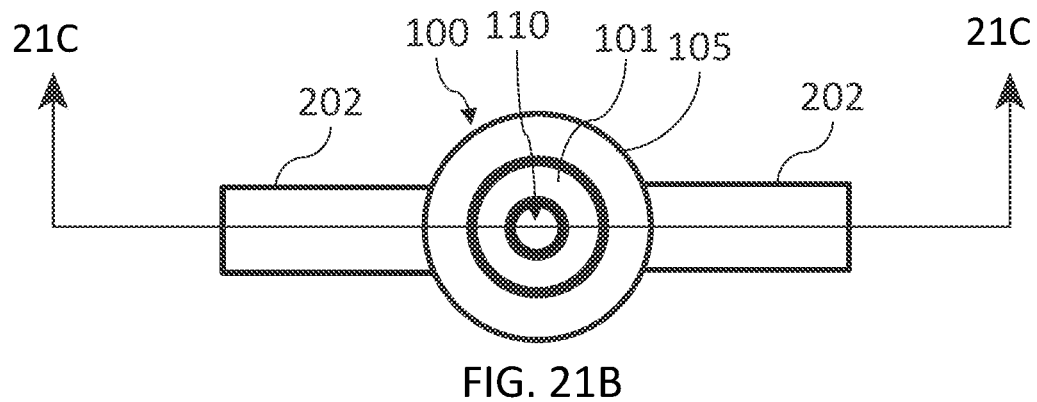
FIG. 21B illustrates a top view of the pressure fit clip of FIG. 21A.
Figure 21C:
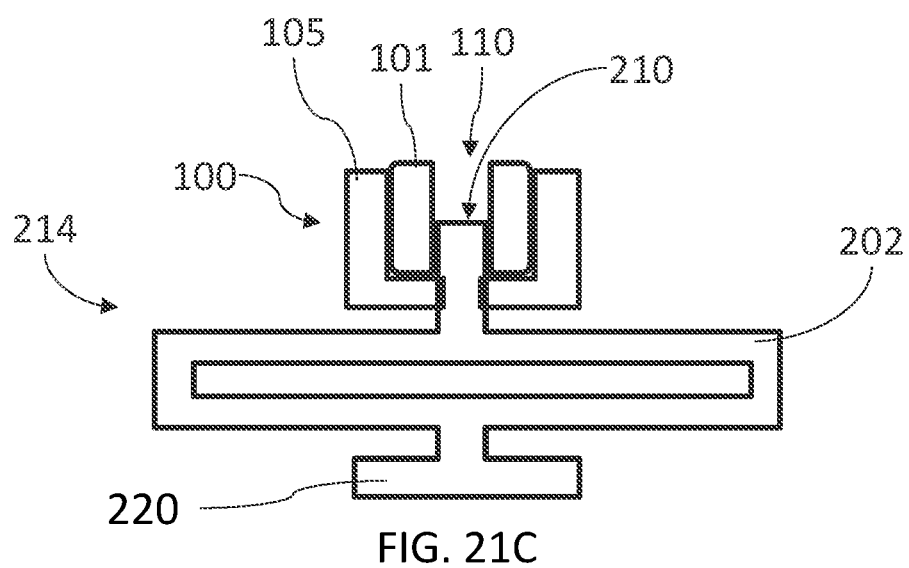
FIG. 21C illustrates a cross section view across 21C-21C.

In a further example, overmold 210 connects to the sides of the magnet assembly 100 and encompasses around a portion of the circumference of magnet bowl 105 through groove 109. In a further example, as shown in FIGS. 21A-21C, overmold 210 connects to magnet assembly 100 through a center hole 110 of magnet bowl 105 and magnet 101, securing the attachment arms 202 to the magnet assembly 100. In this example, an engagement disk is not provided. In this example, the attachment arms 202 extend up and then parallel with the bottom base 220 and extend wider than a width defined by the magnet assembly before coming together and overmolding through hole 110 and engaging the magnet assembly 100.

Attachment arms 202 can connect to the overmold 210 at the base of the magnet bowl 105 or on the sides of magnet bowl 105. In an example, overmold 210 can encompass the top, the bottom and/or the sides of the magnet assembly 100 or combinations thereof.

The magnet 101 or magnet bowl 105 can further define an engagement feature for engaging the overmold of the attachment arms 202. Overmold 210 can be affixed to magnet assembly 100 through radial groove 109 or radial holes 104, as examples of the engagement feature, to increase the connection points of the overmolding to the magnet assembly 100. In a further example, the pressure fit clip can be configured without an engagement disk so that the bottom base 220 inserts into the doghouse 217.

Figure 22A:
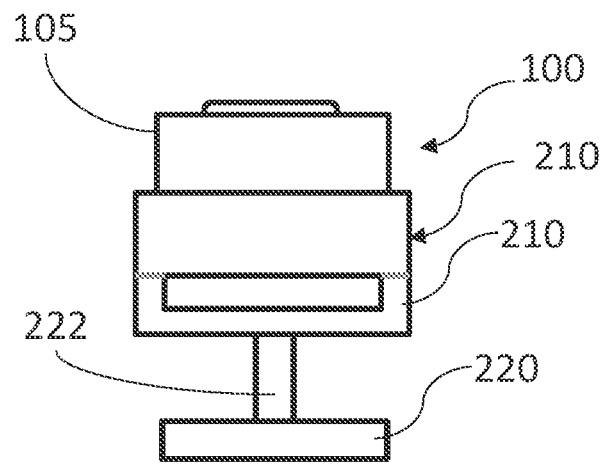
FIG. 22A illustrates a schematic view of a pressure fit clip with a bottom base, with no engagement disc, attachment arms and a magnet assembly configured with a radial groove.
Figure 22B:
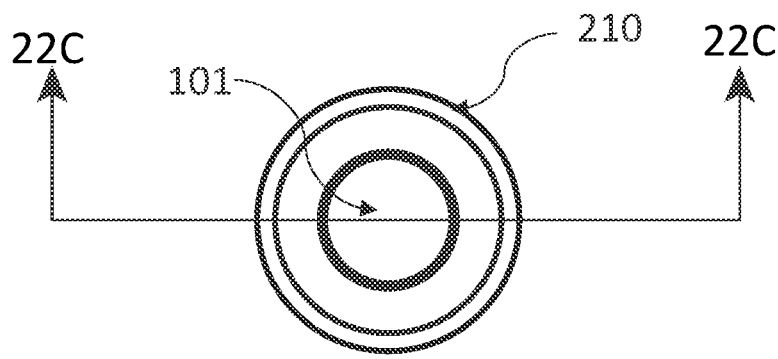
FIG. 22B illustrates a top view of the attachment clip of FIG. 22A.
Figure 22C:
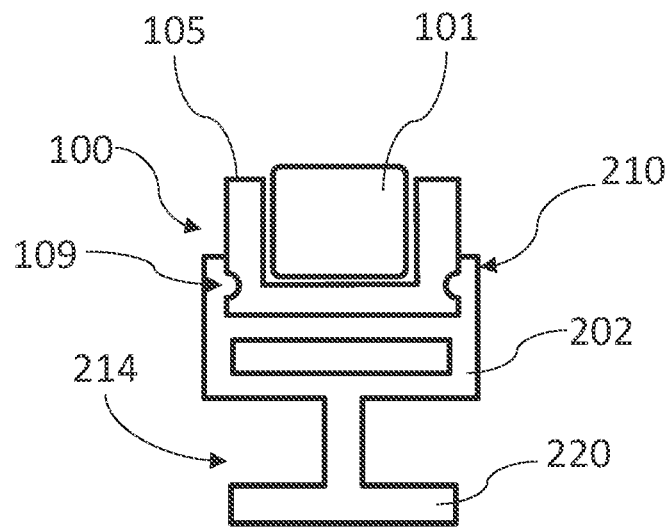
FIG. 22C illustrates a cross section view across 22C-22C.

FIGS. 22A-22C illustrate a pressure fit tool 214 without an engagement clip and overmolding an engagement feature 109 as a radial groove 109 formed on an outer surface of the magnet assembly 100. The overmold 210 forms along a bottom and side portion of the magnet assembly 100.

Figure 23A:
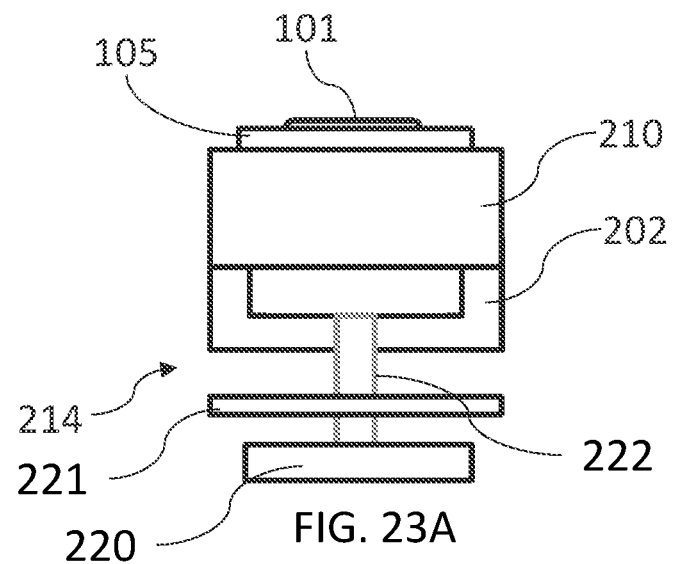
FIG. 23A illustrates a schematic view of a pressure fit clip with a bottom base, an engagement disc, attachment arms and a magnet assembly configured with a radial groove and overmolding encompassing a bottom and side portion of the magnet assembly.
Figure 23B:
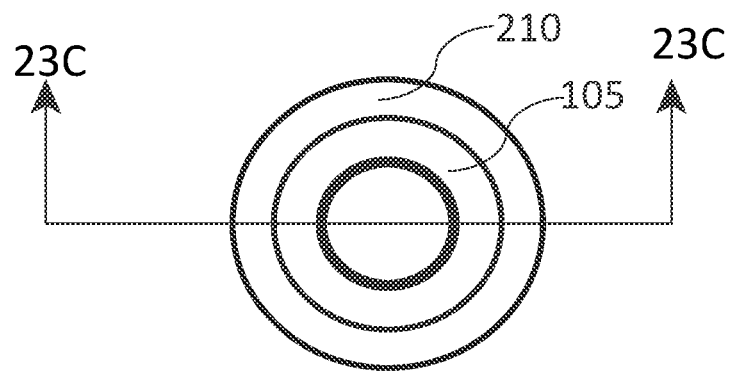
FIG. 23B illustrates a top view of the attachment clip of FIG. 23A.
Figure 23C:
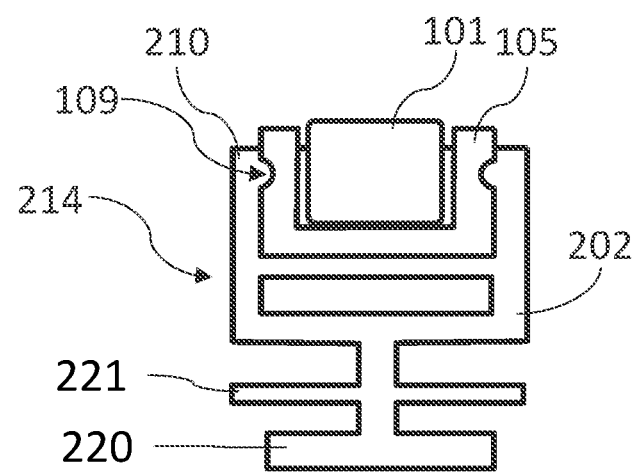
FIG. 23C illustrates a cross section view across 23C-23C.

FIGS. 23A-23C illustrate a pressure fit tool 214 with an engagement clip 221 and overmolding an engagement feature 109 as a radial groove 109 formed on an outer surface of the magnet assembly 100. The overmold 210 forms along a bottom and side portion of the magnet assembly 100.

Figure 24A:
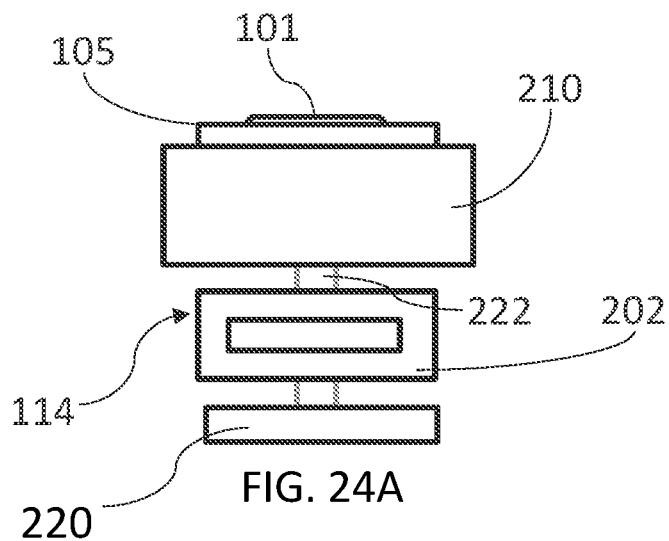
FIG. 24A illustrates a schematic view of a pressure fit clip with a bottom base, attachment arms and a magnet assembly configured with a radial groove and overmolding encompassing a bottom and side portion of the magnet assembly.
Figure 24B:
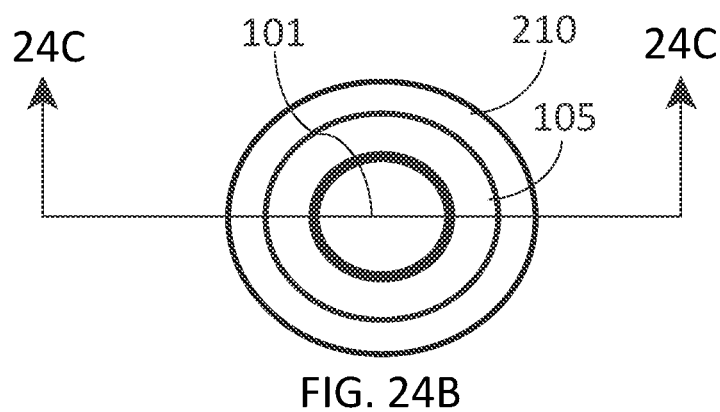
FIG. 24B illustrates a top view of the attachment clip of FIG. 24A.
Figure 24C:
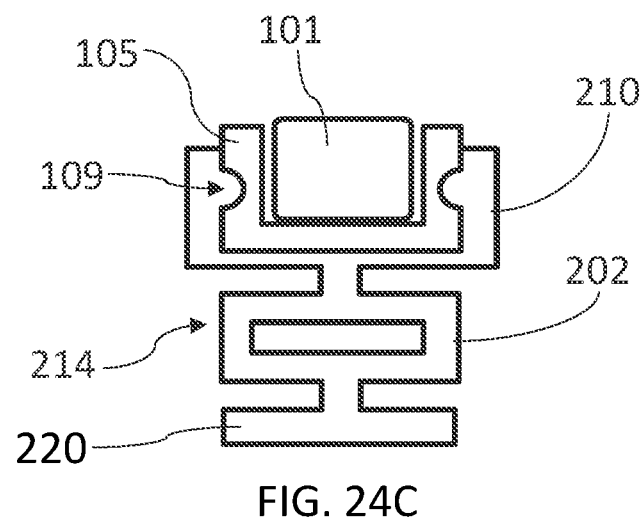
FIG. 24C illustrates a cross section view across 24C-24C.

FIGS. 24A-24C illustrate a pressure fit tool 214 without an engagement clip and overmolding an engagement feature 109 as a radial groove 109 formed on an outer surface of the magnet assembly 100. The overmold 210 forms along a bottom and side portion of the magnet assembly 100. In this example, the attachment arms 202 form a box to add additional flexibility during use.

FIG. 25 illustrates various embodiments of the magnet bowl 105 in which the overmold 210 can affix to the magnet assembly 100. The various embodiments of the magnet bowl include engagement features formed on an outer surface or through the magnet or magnet bowl of the magnet assembly including, but not limited to: radial groove 109, radial holes 104, center hole 110, knurling 111, and knurling 111 with radial holes 104 or radial groove 109. The various embodiments are merely illustrative, and it is understood that the various magnet bowl configurations and overmolding orientations can be used in any combination with one another when used in connection with the panoramic ring, the attachment clip, and/or the pressure fit clip.

The embodiments of the disclosure described herein are exemplary, and numerous modifications, variations and rearrangements can be readily envisioned to achieve substantially equivalent results, all of which are intended to be embraced within the spirit and scope of the disclosure. Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application.

The invention claimed is:

1. A system of securing a connection of a decorative feature to a magnetic attachment surface comprising:
    (a) a decorative feature attached to a substrate;
    (b) a magnet configured to be positioned within the substrate; and
    (c) two or more attachment arms extending away from the substrate and overmolding the magnet;
    wherein the magnet is configured to magnetically secure the decorative feature to a magnetic attachment surface; and
    wherein the magnet is positioned within an interior receiving cavity of a magnet bowl having an outer surface, wherein the magnet and the magnet bowl form a magnet assembly and the two or more attachment arms extend offset from the substrate for overmolding the magnet assembly, and
    wherein the magnet bowl defines an engagement feature, and two or more attachment arms overmold the magnet bowl by engaging with the engagement feature through overmolding and wherein the engagement feature includes a member selected from the group consisting of holes formed radially along the outer surface of the magnet bowl, one or more grooves formed radially along the outer surface of the magnet bowl, knurling formed radially along the outer surface of the magnet bowl, and a center hole of the magnet bowl.

2. The system of claim 1, wherein the decorative feature is a headliner of a vehicle, the substrate is a polymer-based substrate, and the magnetic attachment surface is provided on a frame of the vehicle.

3. The system of claim 2, wherein the headliner defines a sunroof cutout for mounting to a roof frame portion of the vehicle, and the polymer-based substrate forms a panoramic ring that is positioned around the sunroof cutout for magnetically mounting the headliner.

4. The system according to claim 2, further comprising a plurality of magnets distributed throughout the polymer-based substrate, each of the plurality of magnets are offset from the polymer-based substrate by a set of two or more attachment arms extending from the polymer-based substrate and overmolding each of the plurality of magnets, wherein the plurality of magnets distribution is configured to magnetically mount to a roof frame portion of the vehicle having the magnetic attachment surface and safely secure the headliner thereto.

5. The system according to claim 1, wherein the attachment arms overmold the magnet assembly in a configuration selected from the group consisting of fully encompassing the magnet assembly, encompassing a bottom portion of the magnet assembly, encompassing a top portion of the magnet assembly, and encompassing a side portion of the magnet assembly around a circumference of the magnet assembly.

6. The system according to claim 1, wherein the magnet bowl defines an engagement feature, and the two or more attachment arms overmold the magnet bowl by engaging with the engagement feature through overmolding.

7. The system according to claim 1, wherein the two or more attachment arms are configured to allow for movement and articulation for variations in flatness and surface angles of the magnetic attachment surface.

8. The system according to claim 1, wherein the two or more attachment arms include three attachment arms total and wherein the three attachment arms are spaced apart from each other to overmold a magnet offset from the substrate and are integrally formed with the substrate.

9. The system according to claim 1, wherein the two or more attachment arms and the substrate are molded in die draw overmolding the magnet.

\* \* \* \* \*